US008189219B2

(12) United States Patent
Fukasawa

(10) Patent No.: US 8,189,219 B2
(45) Date of Patent: May 29, 2012

(54) IMAGE PROCESSING SYSTEM, INFORMATION PROCESSING APPARATUS, IMAGE PROCESSING APPARATUS, AND IMAGE PROCESSING METHOD

(75) Inventor: Yuichi Fukasawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1264 days.

(21) Appl. No.: 11/871,689

(22) Filed: Oct. 12, 2007

(65) Prior Publication Data

US 2008/0088871 A1  Apr. 17, 2008

(30) Foreign Application Priority Data

Oct. 13, 2006  (JP) ................................ 2006-279634

(51) Int. Cl.
*G06K 1/00* (2006.01)
(52) U.S. Cl. ...................... 358/1.15; 358/448; 358/462
(58) Field of Classification Search .................. 358/1.15, 358/442, 448; 715/745
See application file for complete search history.

(56) References Cited

U.S. PATENT DOCUMENTS

| 7,167,258 | B2 | 1/2007 | Yamamoto | |
| 7,940,408 | B2 * | 5/2011 | Kitada et al. ................. | 358/1.15 |
| 2002/0145627 | A1 * | 10/2002 | Whitmarsh et al. ........... | 345/745 |
| 2003/0038965 | A1 * | 2/2003 | Simpson et al. .............. | 358/1.15 |
| 2003/0090694 | A1 * | 5/2003 | Kennedy et al. .............. | 358/1.15 |
| 2004/0218201 | A1 * | 11/2004 | Lermant et al. ............... | 358/1.15 |
| 2006/0170953 | A1 * | 8/2006 | Okamoto et al. ............. | 358/1.15 |
| 2006/0227363 | A1 * | 10/2006 | Ogura .......................... | 358/1.15 |
| 2007/0223031 | A1 * | 9/2007 | Kitada et al. ................. | 358/1.15 |
| 2007/0245014 | A1 * | 10/2007 | Hibino et al. ................. | 709/223 |
| 2011/0063688 | A1 * | 3/2011 | Hayashi et al. ............... | 358/442 |

FOREIGN PATENT DOCUMENTS

| JP | 2001-051819 A | 2/2001 |
| JP | 2001-257827 A | 9/2001 |
| JP | 2004-021642 A | 1/2004 |
| JP | 2004-234241 A | 8/2004 |

* cited by examiner

*Primary Examiner* — Kimberly A Williams
(74) *Attorney, Agent, or Firm* — Canon U.S.A., Inc. IP Division

(57) ABSTRACT

An image processing apparatus includes an input unit configured to input identification information for identifying a user, an acquisition unit configured to acquire entry management information about an area for which a user identified based on the identification information has an entry authority, and a display unit configured to, in displaying a list of image processing apparatuses that can be sending destinations of data input by the image processing apparatus, display information indicating whether each of the image processing apparatuses is present in an area for which the user has an entry authority based on the entry management information.

9 Claims, 23 Drawing Sheets

DEVICE INFORMATION TABLE

| AREA | DEVICE | DETAIL OF LOCATION | FUNCTION | | | |
|---|---|---|---|---|---|---|
| | | | A | B | C | ... |
| AREA 1 | Dev5500-101 | AREA 1-A3 | ○ | × | × | ○ |
| | Dev5500-105 | AREA 1-B5 | ○ | × | × | ○ |
| | Dev8800-101 | AREA 1-CENTER | ○ | ○ | ○ | ○ |
| | ... | ... | | | | |
| | ... | ... | | | | |
| AREA 2 | Dev5500-102 | AREA 2-A3 | ○ | × | × | ○ |
| | Dev3300-104 | AREA 2-CENTER | ○ | ○ | × | × |
| | ... | ... | | | | |
| | ... | ... | | | | |
| AREA 3 | Dev1500-102 | AREA 3-D2 | × | × | × | ○ |
| | Dev5500-103 | AREA 3-CENTER | ○ | × | × | ○ |
| | ... | ... | | | | |
| | ... | ... | | | | |

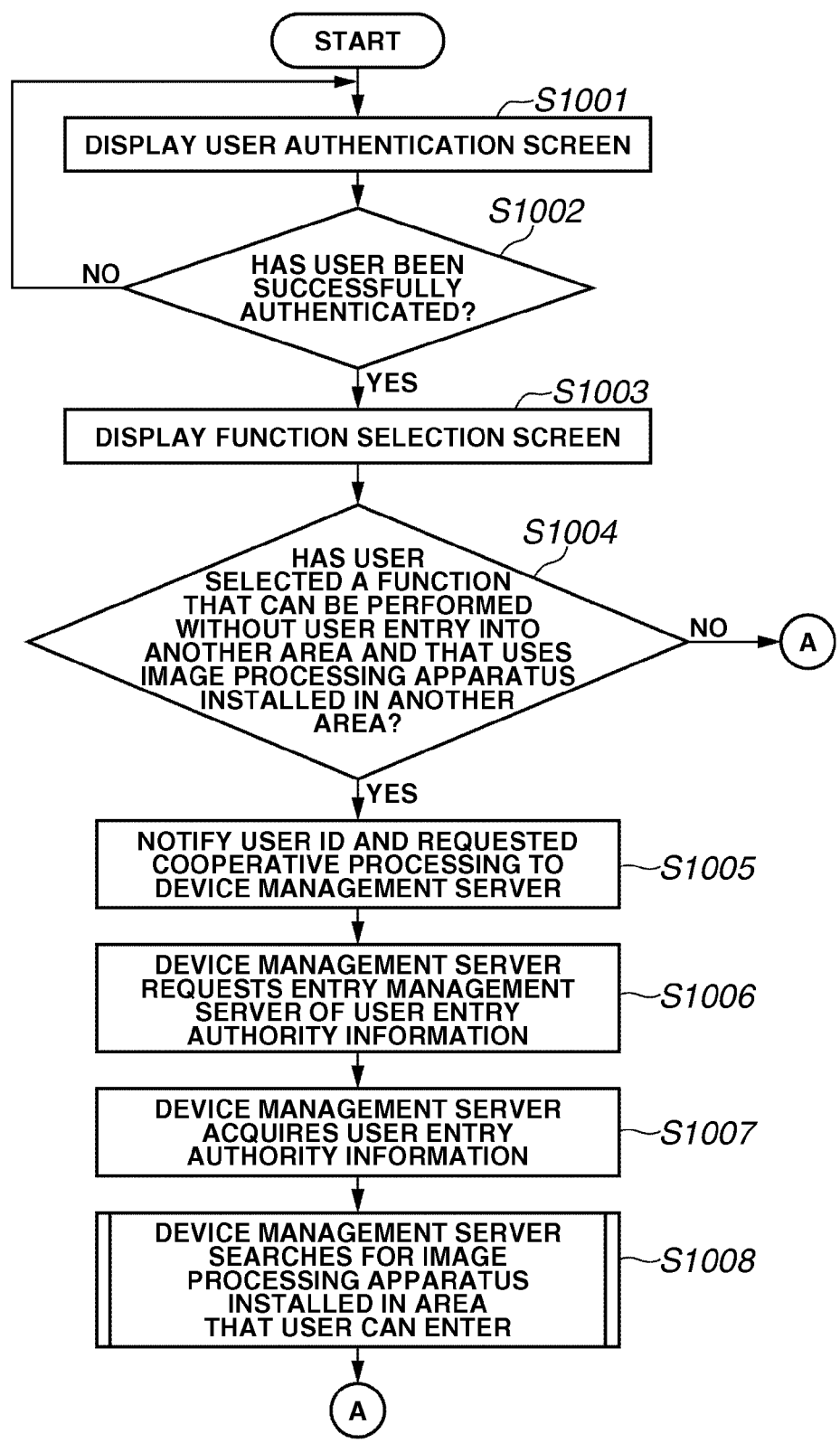

FIG.22

STORAGE MEDIUM SUCH AS FD/CD-ROM

| DIRECTORY INFORMATION |
|---|
| PROGRAM CODE CORRESPONDING TO STEPS IN FLOW CHART OF FIG. 8 |
| PROGRAM CODE CORRESPONDING TO STEPS IN FLOW CHART OF FIG. 15 |
| PROGRAM CODE CORRESPONDING TO STEPS IN FLOW CHARTS OF FIGS. 19A AND 19B |

FIG.23

STORAGE MEDIUM SUCH AS FD/CD-ROM

| DIRECTORY INFORMATION |
| --- |
| PROGRAM CODE CORRESPONDING TO STEPS IN FLOW CHART OF FIG. 13 |
| PROGRAM CODE CORRESPONDING TO STEPS IN FLOW CHART OF FIG. 14 |
| PROGRAM CODE CORRESPONDING TO STEPS IN FLOW CHART OF FIG. 16 |
| PROGRAM CODE CORRESPONDING TO STEPS IN FLOW CHART OF FIG. 17 |
| PROGRAM CODE CORRESPONDING TO STEPS IN FLOW CHART OF FIG. 18 |

IMAGE PROCESSING SYSTEM, INFORMATION PROCESSING APPARATUS, IMAGE PROCESSING APPARATUS, AND IMAGE PROCESSING METHOD

BACKGROUND OF THE INVENTION

1. Field of the Invention

The present invention relates to an image processing system including a plurality of image processing apparatuses in communication with one another.

2. Description of the Related Art

A conventional image processing system includes an image processing apparatus that serves as an image input apparatus and another image processing apparatus that serves as an image output apparatus, which are connected via a network. Japanese Patent Application Laid-Open No. 2001-257827 discusses such an image processing system.

The image processing system discussed in Japanese Patent Application Laid-Open No. 2001-257827 transfers image data read with a scanner to another image processing apparatus to output the transferred image data with a printer of the image processing apparatus that receives the image data.

Furthermore, the image processing system discussed in Japanese Patent Application Laid-Open No. 2001-257827 includes, for example, a scanner that does not include a print function and a printer that does not include a scanner function, which cooperatively operate, and implements a function as a copying machine.

In addition, the image processing system discussed in Japanese Patent Application Laid-Open No. 2001-257827, when the printer of the copying machine is currently used, can transfer a scanned image to another printer connected thereto via a network, and thus can perform image processing without a wait time taken until the printer completes the current processing.

Japanese Patent Application Laid-Open No. 2001-051819 discusses an image processing system configured to allow a user to select an image processing apparatus from among image processing apparatuses for which the user has an authority to use when the user selects a cooperative processing destination image processing apparatus.

Recently, it is demanded that private companies and governmental or municipal offices become more highly sensitive and conscious about an information security to keep a confidence of business information and private information. In this regard, a conventional entry management system (entry and exit management system) manages and controls a user entry into an office room or a business facility to raise a level of information security.

More specifically, in order to enhance an information security, such a conventional entry management system issues an identification (ID) card and a password to a previously registered user, to restrict an entry into an office room or an office building to registered insiders (employees or other persons concerned to a business of a company under a predetermined registration condition). Such an entry management system requires a person entering an office room or an office building to present or enter the issued ID card or password, and permits the person to enter the office room or building only when information described on the ID card or the password matches previously registered ID information or password.

Such a conventional image processing system can be introduced to an office room or office building to which an entry management system is applied.

In this regard, however, in the case where an image processing apparatus that prints out a transferred image has been installed in a room for which a user does not have an entry authority, the user cannot enter the room to pick up a print product of the transferred image data.

SUMMARY OF THE INVENTION

The present invention is directed to an image processing apparatus configured to, when a user selects an image data transfer destination image processing apparatus, allow the user to select an image data transfer destination based on user entry management information previously registered and stored in an entry management system.

According to an aspect of the present invention, an image processing system includes a plurality of image processing apparatuses installed in respective areas in a distributed manner and an information processing apparatus configured to manage each image processing apparatus, each of the plurality of image processing apparatuses and the information processing apparatus being in communication with each other. The information processing apparatus includes a first searching unit configured to search for an image processing apparatus that can satisfy a request issued from another image processing apparatus, a second searching unit configured to search for an image processing apparatus installed in an area for which a user has an entry authority based on user information sent from another image processing apparatus, and a sending unit configured to send a result of the search by the first searching unit and a result of the search by the second searching unit to the another image processing apparatus that issued the request. Each of the plurality of image processing apparatuses includes a request sending unit configured to send a request for performing a cooperative processing with another image processing apparatus to the information processing apparatus, a user information sending unit configured to send entered user information to the information processing apparatus, and a display unit configured to display a list of image processing apparatuses extracted as a result of the search by the first searching unit in response to receiving information sent by the sending unit. The display unit is configured to display information indicating whether each of the image processing apparatuses displayed as the list is present in an area for which a user corresponding to the user information has an entry authority based on a result of the search by the second searching unit.

According to another aspect of the present invention, an information processing apparatus is configured to communicate with a plurality of image processing apparatuses, each of the image processing apparatus being installed in respective areas in a distributed manner. The information processing apparatus includes a first searching unit configured to search for an image processing apparatus that can satisfy a request issued from another image processing apparatus, a second searching unit configured to search for an image processing apparatus installed in an area for which a user has an entry authority based on user information sent from another image processing apparatus, and a sending unit configured to send a result of the search by the first searching unit and a result of the search by the second searching unit to the another image processing apparatus that issued the request.

According to yet another aspect of the present invention, an image processing apparatus includes an input unit configured to input identification information for identifying a user, an acquisition unit configured to acquire entry management information about an area for which a user identified based on the identification information has an entry authority, and a display unit configured to display at least a first image processing apparatus, from among a plurality of image processing apparatuses that can communicate with the image processing apparatus via a network, that is present in an area for which the user has an entry authority based on the entry management information, such that the at least first image processing apparatus present in the area for which the user has an entry authority can be selected as a sending destination of data input by the image processing apparatus, and to display at least a second image processing apparatus, from among a plurality of image processing apparatuses that can communicate with the image processing apparatus via a network, that is present in an area other than the area for which the user has an entry authority based on the entry management information, such that the at least second image processing apparatus present in an area other than the area for which the user has an entry authority cannot be selected by the user as a sending destination of data input by the image processing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 19A is a flow chart illustrating an example of data processing performed by an image processing system according to a third exemplary embodiment of the present invention.

FIG. 22 illustrates a memory map of a storage medium that stores various data processing programs that can be read by an information processing apparatus according to a fifth exemplary embodiment of the present invention.

FIG. 23 illustrates a memory map of a storage medium that stores various data processing programs that can be read by a server apparatus according to the fifth exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
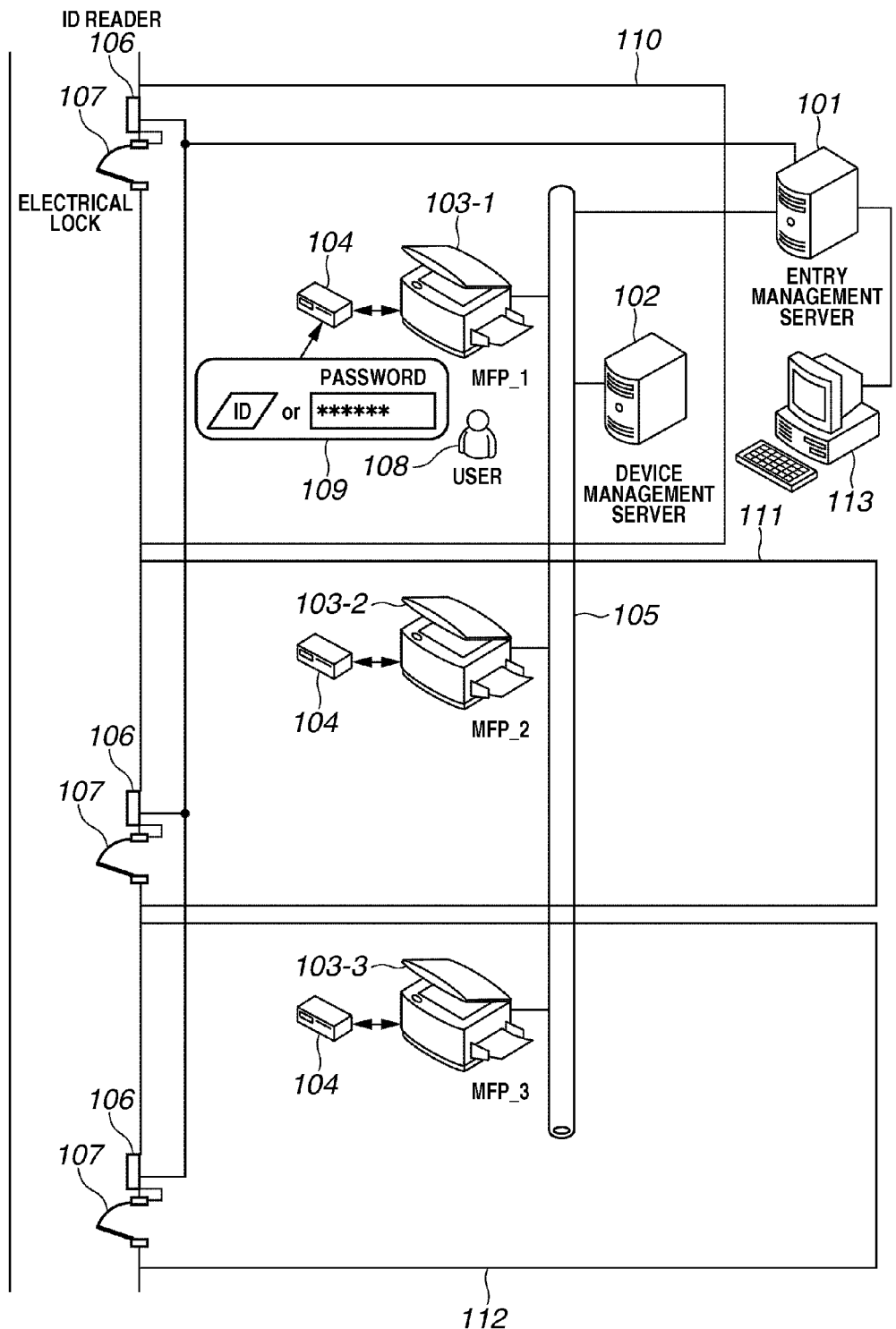
FIG. 1 illustrates an example of a system configuration of an image processing system according to a first exemplary embodiment of the present invention.

A first exemplary embodiment of the present invention is described below. FIG. 1 illustrates an example of a system configuration of an image processing system according to the first exemplary embodiment of the present invention. In the example illustrated in FIG. 1, the image processing system includes image processing apparatuses respectively installed in rooms (areas) for which a user entry management has been applied.

In the example illustrated in FIG. 1, the number of rooms in which an image processing apparatus is installed is three, for easier understanding. However, the number of rooms in which an image processing apparatus is installed can be three or more. Moreover, it is not required to install the image processing apparatus in rooms in the same building. That is, in the present exemplary embodiment, each of the image processing apparatuses can be installed in rooms of buildings present at sufficiently mutually close distances.

Referring to FIG. 1, an entry management server 101 manages a user entry authority. The entry management server 101 includes hardware resources, such as a central processing unit (CPU) 2000, a read-only memory (ROM) 2001, and a random access memory (RAM) 2002 illustrated in FIG. 2, and software resources for performing entry management processing. The entry management server 101 monitors a state of a user entry into areas (rooms) 110 through 112, in which each of the image processing apparatuses is installed.

In addition, the entry management server 101 manages a user entry into the areas (rooms) 110 through 112, for example. The entry management server 101 can be implemented by an information processing apparatus, such as a personal computer (PC).

The areas 110 through 112, for which a user entry is managed by the entry management server 101, each have an electrical lock 107 for controlling a user entry and an entry management user ID reader 106 for authenticating a user.

An administrator of the image processing system enters and registers entry authority information of a user entering each of the areas 110 through 112, who is to be newly registered, via a terminal apparatus 113 connected to the entry management server 101. The terminal apparatus 113 can be locally connected to the entry management server 101 as illustrated in FIG. 1. Alternatively, the terminal apparatus 113 can be connected to the entry management server 101 via a network 105.

In the areas 110 through 112, a user ID authentication apparatus 104 for authenticating a user 108 is connected to each of image processing apparatuses (hereinafter, may be referred to as "device(s)") 103-1 through 103-3.

The user 108 logs into each of the image processing apparatuses 103-1 through 103-3 by using a user ID card uniquely provided to the user 108 or by entering a user ID and a password that have been uniquely provided to the user 108, via the user ID authentication apparatus 104. In the present embodiment, biometric information, e.g., cornea information or finger vein information, of the user 108 can be used for the user authentication processing.

The same ID card can be utilized as an ID card for managing an input operation by the user 108 and an ID card utilized to input user information to the user ID authentication apparatus 104. Alternatively, different ID cards can be utilized for these purposes. The entry management user ID reader 106 and the user ID authentication apparatus 104 read information from the ID card by a radio frequency identification (RFID) or an infrared-ray communication.

A device management server 102 manages information about image processing apparatuses. The device management server 102 includes hardware resources, such as a CPU 2000, a ROM 2001, and a RAM 2002 illustrated in FIG. 2, and software resources for performing entry management processing. The device management server 102 can be implemented by an information processing apparatus such as a PC.

The image processing apparatuses 103-1 through 103-3 are in communication with one another via the network 105.

In the present embodiment, the entry management server 101 and the device management server 102 each have mutually different functions. Alternatively, the device management server 102 can include the functions of the entry management server 101. Further alternatively, the entry management server 101 can include the functions of the device management server 102. With such an alternative configuration, the cost of manufacture of the apparatuses in the image processing system according to the present embodiment can be reduced with a simple configuration.

Furthermore, the functions of the device management server 102 or the entry management server 101 can be provided to each of the image processing apparatuses 103-1 through 103-3.

In the present embodiment, the device management server 102 is installed within the area 110. However, the device management server 102 can be installed in the other areas (i.e., the area 111 or the area 112).

Moreover, the device management server 102 can be separately installed at a location independent of the areas 110 through 112. With such a configuration, the device management server 102 can be installed at an arbitrarily desired location, and thus a system environment that an administrator of the image processing system desires can be freely established.

In the present embodiment, the device management server 102 performs processing for acquiring status information about each of the image processing apparatuses 103-1 through 103-3 at a predetermined time interval or at a timing determined based on a previously set schedule. Accordingly, the processing for acquiring the status information about each of the image processing apparatuses 103-1 through 103-3 can be performed at an optimal timing based on settings set by the user 108 for the image processing system.

Figures 2, 3:
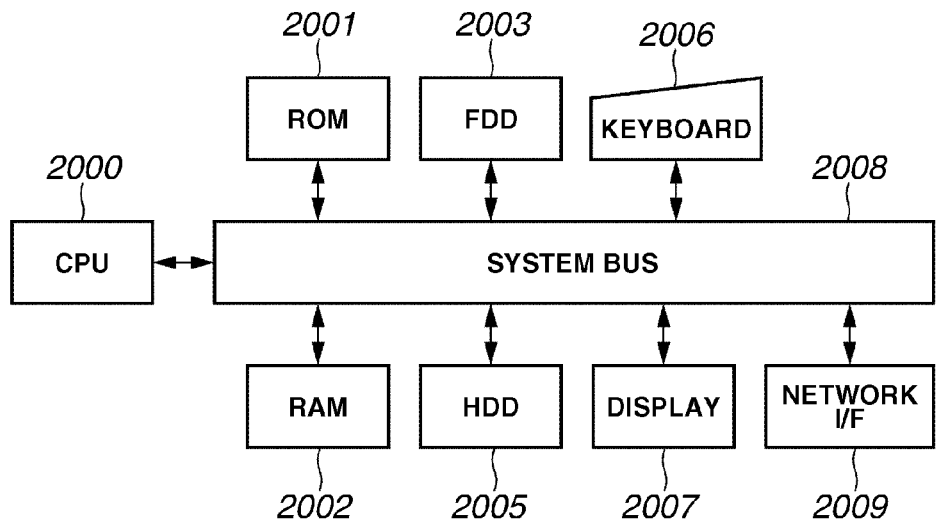
FIG. 2 illustrates an example of a hardware configuration of an entry management server, a device management server, and a terminal apparatus in FIG. 1 according to the first exemplary embodiment of the present invention.
FIG. 3 illustrates an example of a device information table stored in the device management server in FIG. 1 according to the first exemplary embodiment of the present invention.

FIG. 2 illustrates an example of a hardware configuration of the entry management server 101, the device management server 102, and the terminal apparatus 113 in FIG. 1 according to the present embodiment. In the present embodiment, the entry management server 101, the device management server 102, and the terminal apparatus 113 each include the same hardware resources, but the processing speed of the CPU and the capacity of the memory of each of the entry management server 101, the device management server 102, and the terminal apparatus 113 can differ according to the performance (throughput) thereof.

Referring to FIG. 2, each of the entry management server 101, the device management server 102, and the terminal apparatus 113 includes a CPU 2000, a ROM 2001, a RAM 2002, a floppy disk drive (FDD) 2003, a hard disk drive (HDD) 2005, a keyboard 2006, a display 2007, and a network interface (I/F) 2009, which are mutually connected via a system bus 2008.

The ROM 2001 stores basic input/output (I/O) programs (basic input output system (BIOS)) executed by the CPU 2000 and font data. The CPU 2000 reads from and executes an operating system (OS) and an application program stored on the ROM 2001 (or the FDD 2003 or the HDD 2005) and loaded on the RAM 2002, to control the entry management server 101, the device management server 102, or the terminal apparatus 113.

The display 2007 displays a UI screen for processing performed based on the application program. The keyboard 2006 and a pointing device (not illustrated) can be operated by the user 108 to issue an instruction via the UI screen displayed on the display 2007.

The HDD 2005 stores a program for performing processing in each of flow charts described below.

The network I/F 2009 is an interface such as a universal serial bus (USB) or Institute of Electrical and Electronic Engineers (IEEE) 1394 for performing data communication among the image processing apparatuses 103-1 through 103-3 (FIG. 1) based on a predetermined protocol.

FIG. 3 illustrates an example of a device information table stored in the device management server 102 in FIG. 1 according to the present embodiment.

Referring to FIG. 3, the device management server 102, when the device management server 102 has detected an image processing apparatus newly connected to the network 105, acquires device information (information about the newly connected image processing apparatus) sent there from.

The device management server 102 stores the acquired information in the device information table stored in the HDD 2005 of the device management server 102. That is, a part of the HDD 2005 serves as a device information storage unit.

In the case where the device management server 102 includes the functions of the entry management server 101, the device management server 102 stores entry control information set to each user as well as the device information.

If, in the example in FIG. 1, the image processing apparatus 103-3 has been newly introduced in the area 112, the image processing apparatus 103-3 sends its own device information to the device management server 102. More specifically, the image processing apparatus 103-3 sends its own device information to the device management server 102 via the network 105 when the image processing apparatus 103-3 is connected to the network 105.

Thus, the device management server 102 can acquire information about an image processing apparatus connected via the network 105 that can perform cooperative processing with a cooperative processing source image processing apparatus.

In the case where an optional apparatus, such as a sheet post-processing apparatus, has been connected to the image processing apparatus 103-3 and thus the system configuration has been changed, the image processing apparatus 103-3 sends its own device information to the device management server 102.

The device information stored on the HDD 2005 of the device management server 102 can include a device name 202, an area name 201 of an area in which the image processing apparatus is installed, and detailed information 203 about a location of installation of the image processing apparatus.

In addition, the device management server 102 stores on the HDD 2005 a list of functions 204 of each of the image processing apparatuses. Here, the functions of the image processing apparatus include a scan function, a print function, a color scan function, a color print function, a two-sided print function, a staple function, and a 2-in-1 print function. Furthermore, the device management server 102 stores on the HDD 2005 an ID number uniquely provided to each image processing apparatus, such as an Internet protocol (IP) address of the image processing apparatus, although not illustrated in FIG. 3.

With the above-described exemplary configuration, the image processing system according to the present embodiment performs the following cooperative processing including a user authentication operation.

When the user 108 presses a cooperative processing button to perform processing of a job by a cooperative processing with another image processing apparatus (i.e., to perform a cooperative processing) in the image processing system in FIG. 1, the image processing apparatus 103-1 sends user ID information of the user currently logged into the image processing apparatus 103-1 and information about a function requested by the login user to the device management server 102.

Then, the device management server 102 issues a request for entry authority information about the user to the entry management server 101, based on the received user ID information. The entry management server 101 receives the request from the device management server 102, and then searches for information about an area that the user 108 can enter (entry authority information) stored therein, and then sends a result of the search to the device management server 102.

After having received the entry authority information of the user 108 from the entry management server 101, the device management server 102 searches for an image processing apparatus that is installed in the area for which the user 108 has an entry authority, based on the information about the image processing apparatuses that the device management server 102 stores (FIG. 2).

If, as a result of the search, image processing apparatuses installed in the area for which the user 108 has an entry authority are found, the device management server 102 generates a list of the image processing apparatuses satisfying the search condition.

Next, the device management server 102 searches, from among the image processing apparatuses in the above-described list, for image processing apparatuses that can execute the function requested by the user 108, based on the device information stored in the device management server 102 (FIG. 2). In the present embodiment, the function refers to a cooperative processing function. That is, the device management server 102 determines whether image processing apparatuses that correspond to the requested cooperative function are present in the listed image processing apparatuses.

Then, the device management server 102, according to the result of the search for image processing apparatuses that can execute the function requested by the user 108, searches for image processing apparatuses installed in the area that the user 108 can enter and that can execute the function requested by the user 108.

The device management server 102 sends a list of devices obtained as a result of the search to the image processing apparatus 103-1, which is currently operated by the user 108. After having received the device list from the device management server 102, the image processing apparatus 103-1 displays on the UI screen a list of image processing apparatuses that can execute the cooperative function (device list).

Then, the user 108 selects a cooperative processing destination candidate image processing apparatus from among the image processing apparatuses in the device list.

An exemplary configuration of the image processing apparatuses 103-1 through 103-3 according to the present embodiment is described below.

Figure 4:
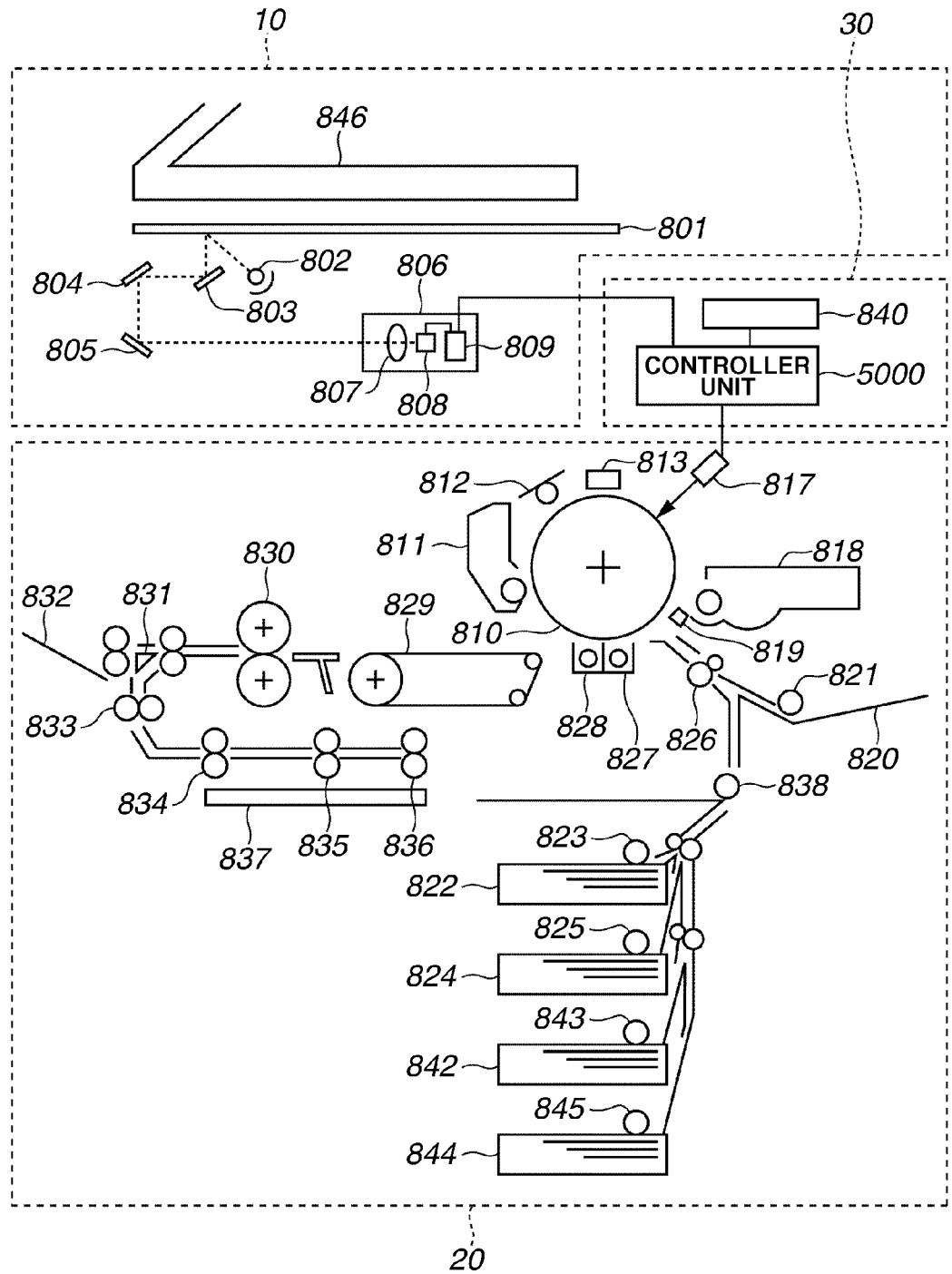
FIG. 4 is a cross section illustrating an example of a configuration of an image processing apparatus according to the first exemplary embodiment of the present invention.

FIG. 4 is a cross section illustrating an example of a configuration of the image processing apparatus according to the present embodiment. The image processing apparatuses 103-1 through 103-3 each includes a scanner unit 10, a printer unit 20, and a control unit 30.

In the example in FIG. 4, the functions of the image processing apparatuses 103-1 through 103-3 can be expanded by connecting an optional unit thereto. Furthermore, resource configurations of the image processing apparatuses 103-1 through 103-3 including an engine type and an image processing function can mutually differ.

For example, in the image processing system according to the present embodiment, the capacity (throughput) of the image processing apparatuses 103-1 through 103-3 can differ according to the capacity of the CPU. In addition, the image processing apparatuses 103-1 through 103-3 can include a color printer engine or a monochromatic printer engine. Furthermore, one or more of the image processing apparatuses 103-1 through 103-3 can include a color printer engine and the other can include a monochromatic printer engine, or vice versa.

Moreover, the device management server 102 manages each of the image processing apparatuses 103-1 through 103-3 recognizing that the image processing apparatuses 103-1 through 103-3 have mutually different resource configurations in the case where the image processing system according to the present embodiment has a configuration in which a print paper that can be used is identified.

As described above, in the present embodiment, the following description is made as to a configuration in which the image processing apparatuses 103-1 through 103-3 each have the same configuration. However, the present invention can be applied to a system in which the image processing apparatuses 103-1 through 103-3 have a mutually different resource configuration.

In addition, in the present embodiment, the function that can be executed by the image processing apparatuses 103-1 through 103-3 includes a sheet post-processing function, a two-sided print function, a color print function, a facsimile transmission function, and an image editing function, according to the resources of the image processing apparatuses 103-1 through 103-3. However, functions other than those described above can be included in the function that can be executed by the image processing apparatuses 103-1 through 103-3.

Referring to FIG. 4, documents fed from an auto document feeder 846 are serially placed at a predetermined position on a document glass table 801.

A document illumination lamp 802 includes a xenon lamp or a halogen lamp. The document illumination lamp 802 exposes the document placed on the document table glass 801. Scanning mirrors 803, 804, and 805 are included in an optical scanning unit (not illustrated). The scanning mirrors 803, 804, and 805 reciprocatingly move to guide reflection light from the document to a charge-coupled device (CCD) unit 806.

The CCD unit 806 includes an imaging lens 807, an image sensor 808, and a CCD driver 809. The imaging lens 807 forms an image from the reflection light from the document on the image sensor 808. The CCD driver 809 drives the image sensor 808.

An image signal output from the image sensor 808 is converted into 8-bit digital data, and the converted digital data is input to a controller unit 5000.

A photosensitive drum 810 is subjected to removal of electricity by a pre-exposure lamp 812 to prepare for an image forming operation. A primary charging device 813 evenly charges a surface of the photosensitive drum 810.

An exposure unit 817 includes a semiconductor laser device. The exposure unit 817 exposes the photosensitive drum 810 according to image data processed by the controller unit 5000, which controls the image processing apparatus 103-1 through 103-3 and the image forming operation, to form an electrostatic latent image on the photosensitive drum 810.

A development device 818 contains a black developer (toner) in its developer chamber. A pre-transfer charging device 819 applies a high pressure to the photosensitive drum 810 before the toner image formed on the photosensitive drum 810 is transferred onto a recording medium, such as print paper.

Each of a manual paper feed unit 820 and paper feed units 822, 824, 842, and 844 feeds a recording medium into each of the image processing apparatuses 103-1 through 103-3 by a drive force from each of recording medium feed rollers 821, 823, 825, 843, and 845. The recording medium having an image temporarily transferred onto it stops at a position at which a registration roller 826 is disposed, to adjust a timing of writing the image formed on the photosensitive drum 810, and then is fed again to downstream units.

A transfer charging device 827 transfers the toner image developed on the photosensitive drum 810 to the recording medium being fed. A separation charging device 828 separates the recording medium, onto which the toner image is completely transferred, from the photosensitive drum 810. Toner remaining on the photosensitive drum 810 after the transfer operation is recovered by a cleaner 811.

A conveyance belt 829 conveys the recording medium having the transferred image to a fixing device 830. The fixing device 830 applies heat to the recording medium to fix the transferred image. A flapper 831 controls a conveyance path for the recording medium having the fixed image to a direction of a sorter 832 or an intermediate tray 837.

Paper feed rollers 833 through 836 each feed the recording medium having the fixed image to the intermediate tray 837 by reversing the recording medium in the case of a multiple recording operation or by not reversing the recording medium in the case of a two-sided recording operation. A recording medium re-feed roller 838 feeds again the recording medium mounted on the intermediate tray 837 to the position at which the registration roller 826 is disposed.

The development device 818 contains color developers such as a magenta developer, an yellow developer, a cyan developer, etc., as well as the black toner, in its developer chamber. Four or more development devices 818 can be arranged in tandem along the photosensitive drum 810 to for a full color image. Alternatively, instead of using the above-described configuration in which a plurality of development devices 818 are arranged, a plurality of photosensitive drums 810 can be arranged in tandem to form an image of each color and transfer the formed color images onto the transfer paper.

The controller unit 5000 includes a micro computer (CPU) and an image processing unit. The controller unit 5000 controls the above-described image forming operation according to an instruction issued by a user via a user interface (UI) device 840. The UI device 840 includes an operation unit 900 (FIG. 5), as described below.

Figure 5:
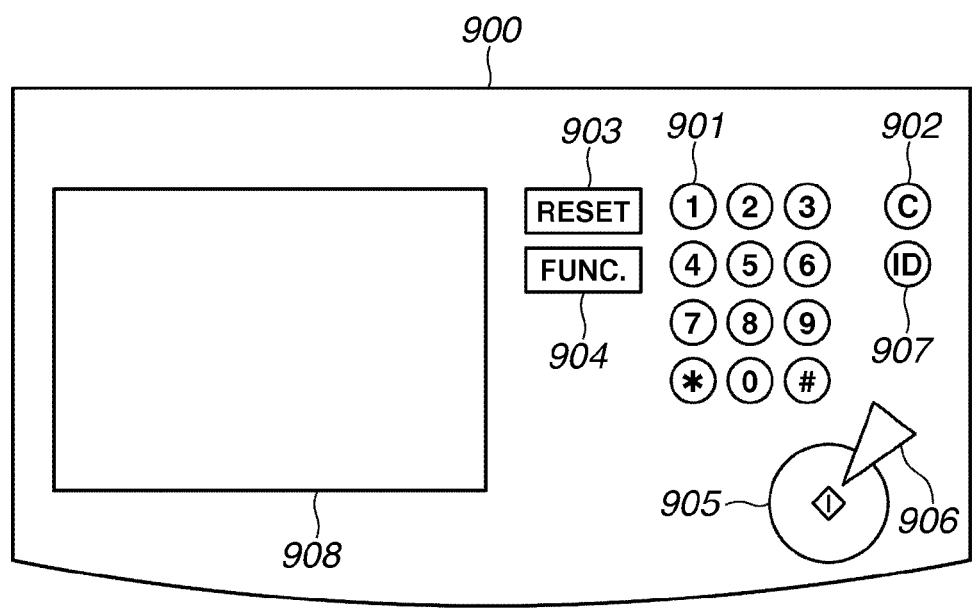
FIG. 5 illustrates an example of a configuration of a user interface (UI) device illustrated in FIG. 4 according to the first exemplary embodiment of the present invention.

FIG. 5 illustrates an example of a configuration of the UI device 840 illustrated in FIG. 4 according to the present embodiment.

Referring to FIG. 5, the operation unit 900 includes a numeric keypad 901. The numeric keypad 901 can be operated by the user 108 to enter a number of copies, a phone number in the case of a facsimile transmission, a user ID, and a password.

A clear button 902 can be operated by the user 108 to issue an instruction for canceling a once performed setting. A reset button 903 can be operated by the user 108 to issue an instruction for resetting a once designated setting. A function button 904 can be operated by the user 108 to issue an instruction for starting processing corresponding to various functions of the image processing apparatuses 103-1 through 103-3 and performing various settings thereto.

A start button 905 can be operated by the user 108 to issue an instruction for starting a job such as a copy job, a facsimile transmission job, and a scan job. A stop button 906 can be operated by the user 108 to issue an instruction for stopping a currently performed job.

A button 907 can be operated by the user 108 to issue an instruction for shifting to a user ID input screen (login screen). The user 108 presses the button 907 to log off from the image processing apparatus into which the user 108 is currently logged. The user 108 mainly performs an input operation for performing various settings via a touch panel-equipped monitor 908. For the touch panel-equipped monitor 908, a liquid crystal display (LCD) can be used in order to achieve a thin monitor.

The touch panel-equipped monitor 908 can display a UI screen, which is described later below, according to a control operation of the controller unit 5000.

The image processing system, including the image processing apparatuses 103-1 through 103-3, according to the present embodiment is described in more detail below.

An example of the present embodiment will be described wherein an administrator of an entry management system of a facility controls and manages the entry and exit of a user of the facility. In the example, the image processing apparatuses 103-1 through 103-3 are in communication with one another via the network 105 and are used in cooperation with one another. The image processing apparatuses 103-1 through 103-3 can be a copying machine, a printer, a facsimile apparatus, a scanner, or a multifunction peripheral (MFP).

First, the administrator provides a plurality of areas to which the image processing apparatuses 103-1 through 103-3 (cooperative devices) are introduced. Here, a user entry management and a user entry control are performed on each of the areas. The entry management and the entry control are described below in an example of managing user entry.

In introducing the cooperative devices into the areas, an entry management and control system can be provided before introducing the cooperative devices. Alternatively, the entry management and control system for managing and controlling user entry into an office room or building, to which the cooperative devices are to be introduced, can be provided at the same time as the introduction of the cooperative devices.

The entry management and control system includes the entry management server 101, the entry management user ID reader 106, the electrical lock 107, and the areas 110 through 112 illustrated in FIG. 1.

The device management server 102, which manages the device information of each of the image processing apparatuses 103-1 through 103-3, is connected to each of the image processing apparatuses 103-1 through 103-3 via the network 105. Furthermore, the entry management server 101, which performs the entry management and control, is in communication with each of the image processing apparatuses 103-1 through 103-3 and the device management server 102 via the network 105.

The user 108 of each of the image processing apparatuses 103-1 through 103-3 is previously registered to the entry management server 101. The user 108 is also a user of the entry management and control system.

In the present exemplary embodiment, the user 108 uses the image processing apparatuses 103-1 through 103-3 for a cooperative processing. That is, the user 108 performs a copy job with two or more image processing apparatuses operating in parallel to one another to perform a copy operation of a large number of copies.

Cooperative processing between one image processing apparatus and another image processing apparatus is referred to as a "cascade copy". Cascade copying is one type of cooperative processing in the image processing system according to the present embodiment.

Figure 6:
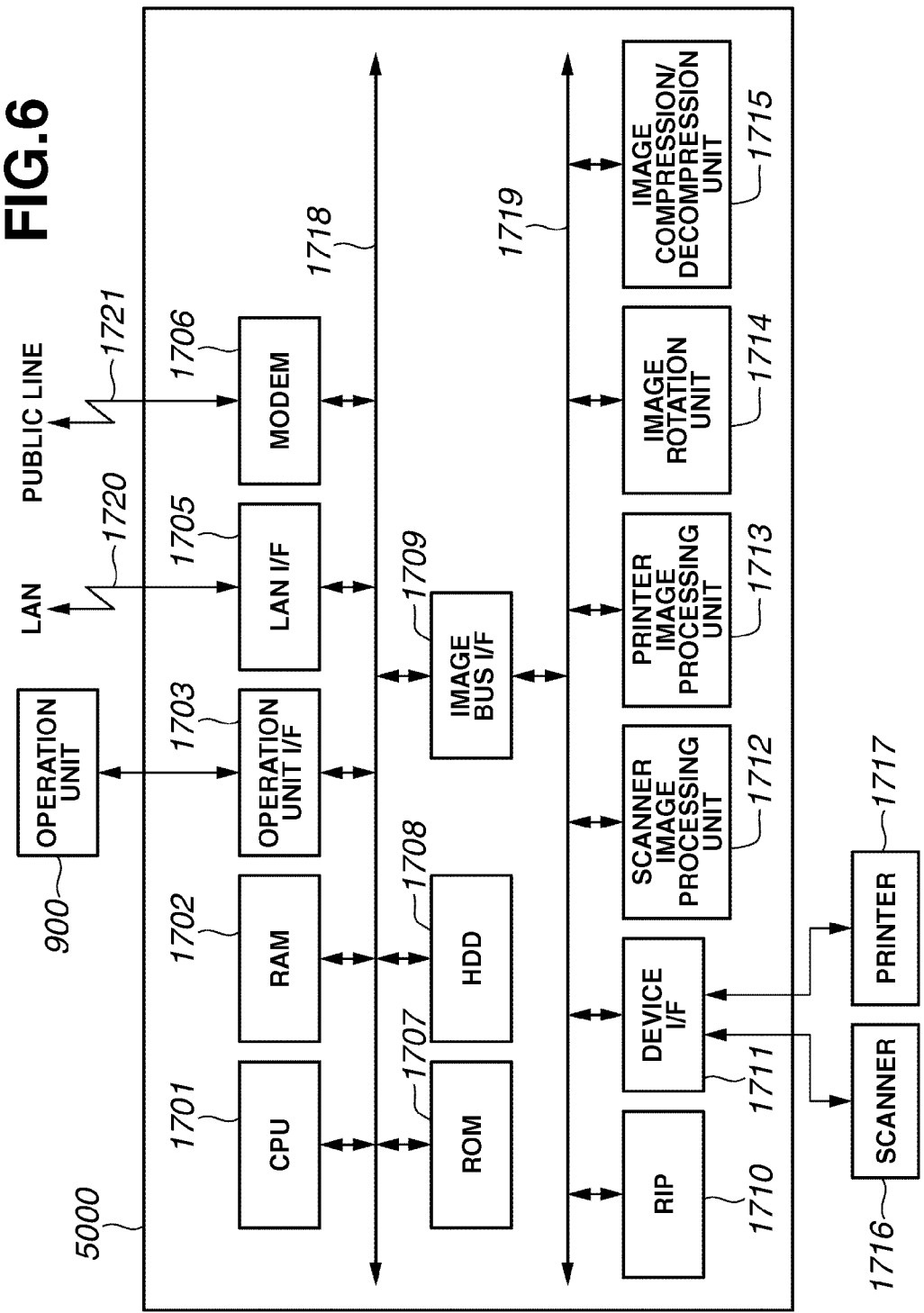
FIG. 6 illustrates an example of a configuration of a controller unit illustrated in FIG. 4 according to the first exemplary embodiment of the present invention.

FIG. 6 illustrates an example of a configuration of the controller unit 5000 illustrated in FIG. 4 according to the present embodiment.

Referring to FIG. 6, the controller unit 5000 is connected to a scanner 1716, which is an image input device, and a printer 1717, which is an image output device. The controller unit 5000 is also connected to a local area network (LAN) 1720 and a public line (wide area network (WAN)) 1721, to input and output image information and device information.

A CPU 1701 controls the controller unit 5000. A RAM 1702 serves as a system work memory for the CPU 1701. The RAM 1702 also serves as an image memory for temporarily storing image data.

A ROM 1707 is a boot ROM and stores a boot program for the system. An HDD 1708 stores system software and image data.

An operation unit I/F 1703 is an interface between each of the image processing apparatuses 103-1 through 103-3 and the operation unit (user interface (UI)) 900 and outputs to the operation unit 900 image data to be displayed on the operation unit 900. The operation unit I/F 1703 sends information input by the user 108 via the operation unit 900 to the CPU 1701.

A LAN I/F 1705 is an interface between each of the image processing apparatuses 103-1 through 103-3 and the LAN 1720. The LAN I/F 1705 serves as a communication unit for a data communication between each of the image processing apparatuses 103-1 through 103-3 and other apparatuses in communication with each of the image processing apparatuses 103-1 through 103-3 via the LAN 1720. A modem 1706 is configured to input and output information via a public line 1721. The above-described devices and units are in communication with one another via a system bus 1718.

An image bus I/F 1709 is an interface between the system bus 1718 and an image bus 1719, through which image data is transferred at a high speed. The image bus I/F 1709 is a bus bridge for converting a data structure.

A high-speed bus, such as a peripheral component interconnect (PCI) bus, can be used as the image bus 1719. The following devices and units are in communication with one another via the image bus 1719.

A raster image processor (RIP) 1710 rasterizes page description language (PDL) code sent via the network into a bitmap image. A device I/F 1711 is an interface between the controller unit 5000 and input/output devices, such as the scanner 1716 and the printer 1717. The device I/F 1711 converts synchronous image data into asynchronous image data and vice versa.

A scanner image processing unit 1712 performs correction, processing, and editing on image data input by the scanner 1716. A printer image processing unit 1713 performs processing, such as image correction and resolution conversion, on image data to be printed out according to a performance of the printer 1717.

An image rotation unit 1714 rotates image data. An image compression/decompression unit 1715 compresses and decompresses multi-valued image data according to Joint Photographic Experts Group (JPEG) format. In addition, the image compression/decompression unit 1715 compresses and decompresses binary image data according to Joint Bi-level Image Experts Group (JBIG) format, Modified Modified Read (MMR) format, and Modified Huffman (MH) format.

The HDD 1708 stores various information about an image output speed and an installation location with respect to nodes connected to the network (the LAN 1720) for each address.

Figure 7:
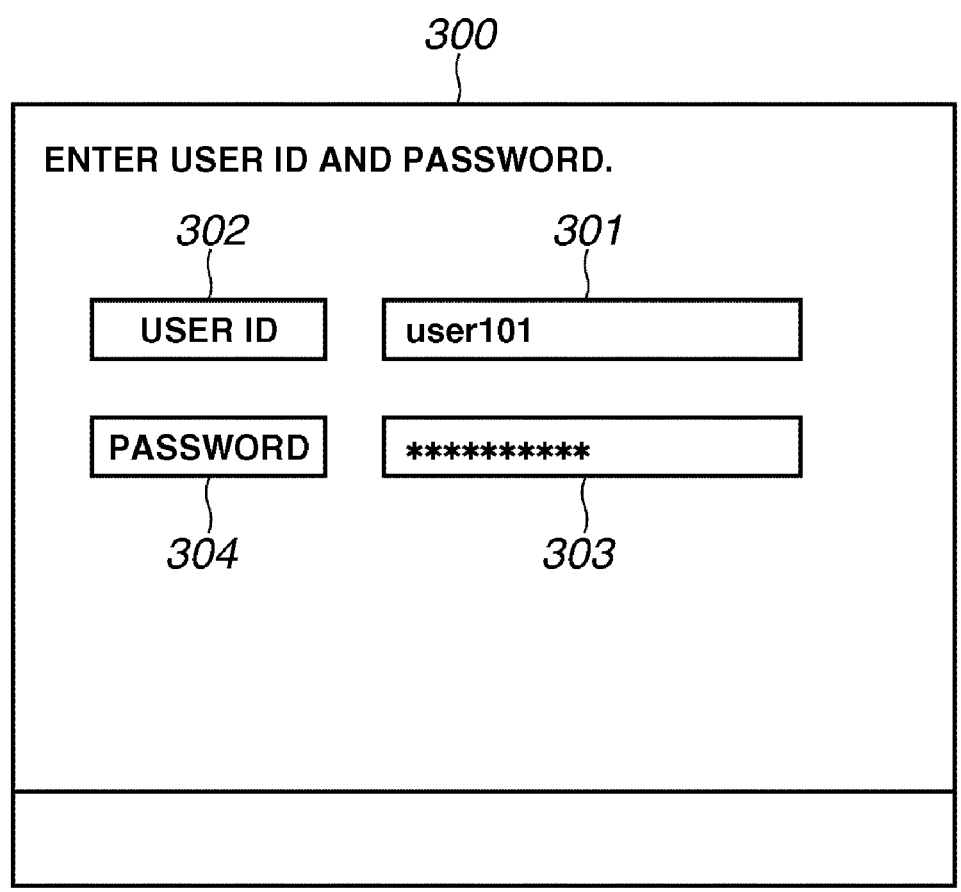
FIG. 7 illustrates an example of a configuration of a UI screen displayed on a monitor in FIG. 5 according to the first exemplary embodiment of the present invention.

FIG. 7 illustrates an example of a configuration of the UI screen displayed on the monitor 908 in FIG. 5 according to the present embodiment.

Referring to FIG. 7, the touch panel-equipped monitor 908 includes a user login screen 300. A user ID button 302 can be operated by the user 108 to enter a user ID in a user ID entry field 301 via the operation unit 900.

A password button 304 can be operated by the user 108 to enter a password in a password entry field 303 via the operation unit 900.

Figure 8:
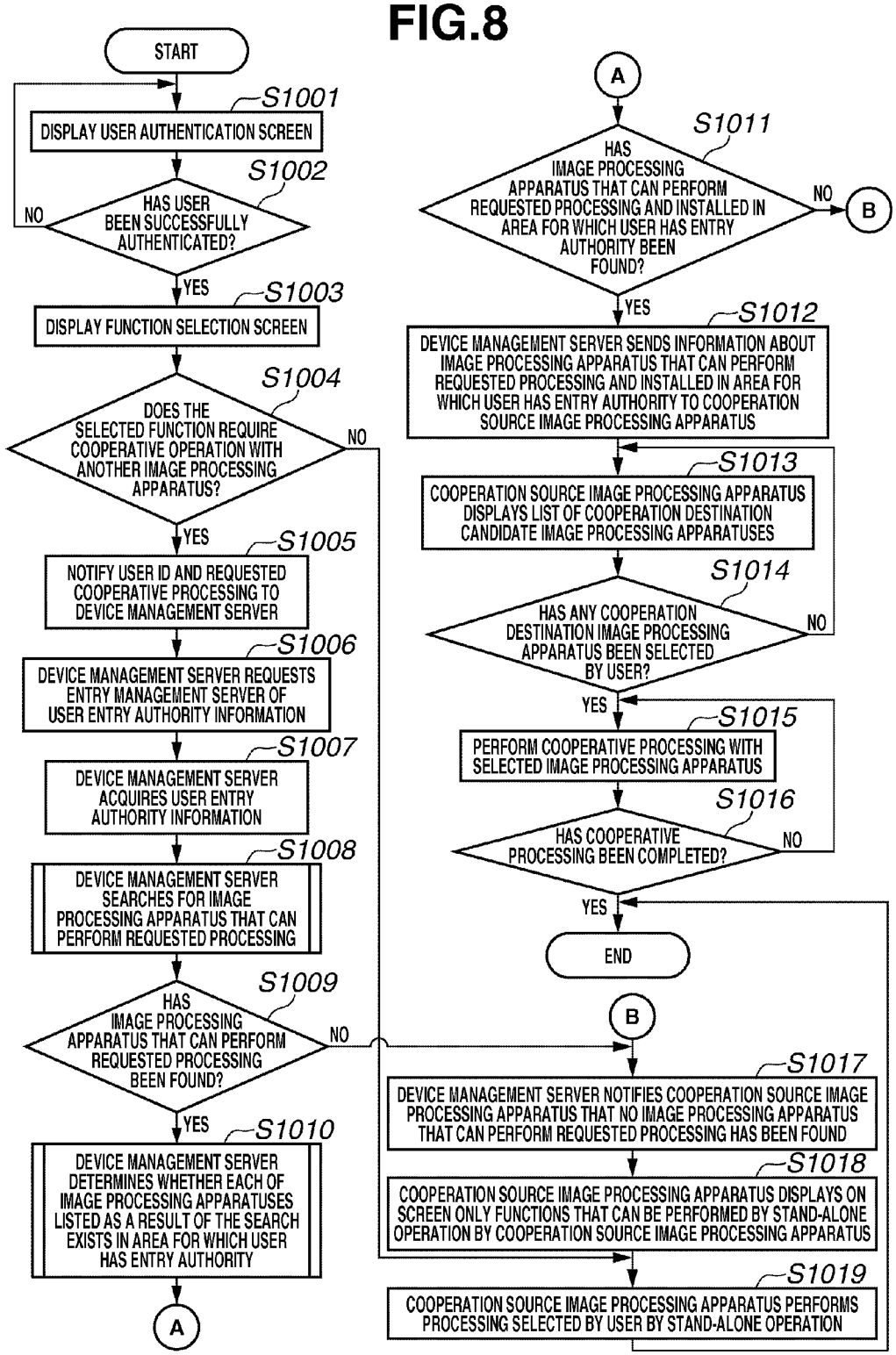
FIG. 8 is a flow chart illustrating an example of data processing performed in the image processing system according to the first exemplary embodiment of the present invention.

FIG. 8 is a flow chart illustrating an example of data processing performed in the image processing system according to the present embodiment.

The data processing performed according to the flow chart of FIG. 8 is performed by the image processing apparatuses 103-1 through 103-3 and the device management server 102 constituting the image processing system. Furthermore, the data processing performed according to the flow chart of FIG. 8 corresponds to processing performed when the user 108 issues an instruction for starting data processing performed by the image processing apparatus currently operated by the user 108 and another image processing apparatus installed in an area other than the area in which the currently operated image processing apparatus is installed, in a cooperative processing.

Each of the steps in the flow chart of FIG. 8 can be implemented with the CPU 1701 of the controller unit 5000 of each of the image processing apparatuses 103-1 through 103-3 by loading a control program from the ROM 1707 on the RAM 1702. In addition, each of the steps in the flow chart of FIG. 8 can be implemented with the CPU 2000 of the device management server 102 by loading a control program from the ROM 2001 (or the FDD 2003 or the HDD 2005) on the RAM 2002.

Figure 9:
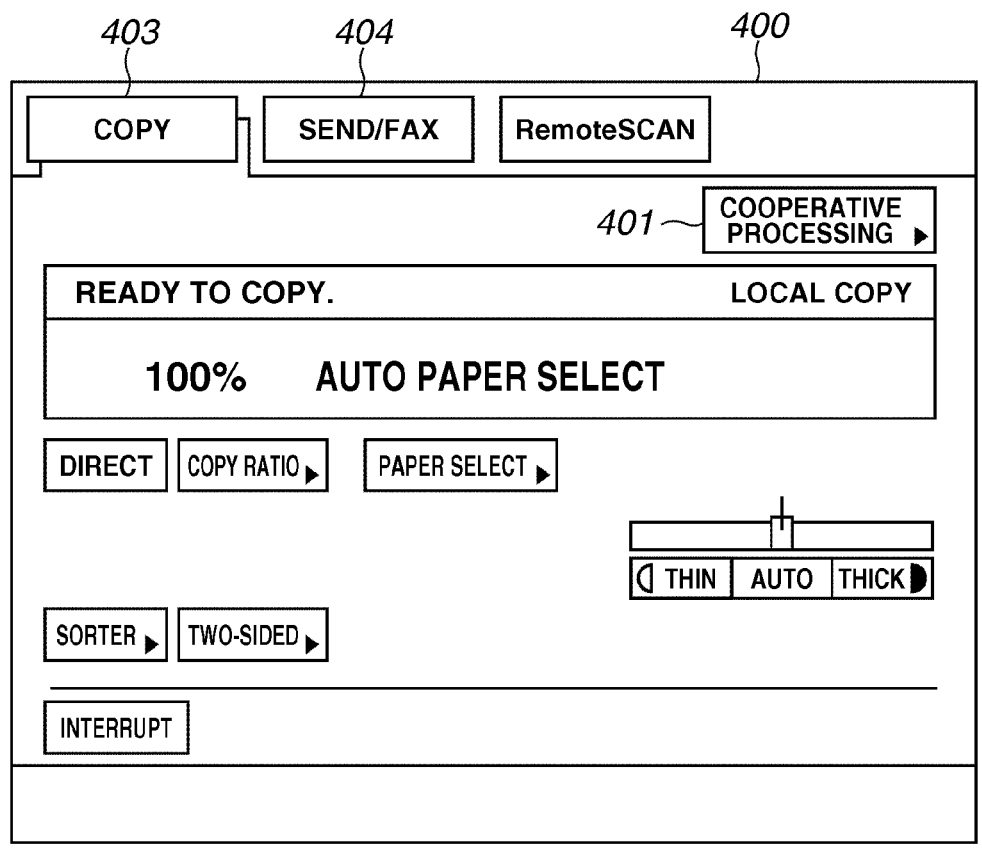
FIG. 9 illustrates an example of a configuration of a UI screen displayed on the monitor in FIG. 5 according to the first exemplary embodiment of the present invention.

FIG. 9 illustrates an example of a configuration of a UI screen displayed on the touch panel-equipped monitor 908 in FIG. 5 according to the present embodiment. The UI screen illustrated in FIG. 9 is a copy setting screen.

Referring to FIG. 9, a cooperative processing button 401 can be operated by the user 108 to issue an instruction for shifting to a screen that displays a list of image processing apparatuses that can perform the cooperative processing, which are managed by the device management server 102.

A function tab 403 corresponds to a copy function tab. A function tab 404 corresponds to a send/facsimile function tab.

Turning to FIG. 8, in step S1001, the user 108, after having entered area 110 to perform a copy job, operates the operation unit 900 of the image processing apparatus 103-1 to log into the image processing apparatus 103-1.

More specifically, the user 108 enters a user ID and a password uniquely provided to the user 108 via the UI screen (FIG. 7) of the image processing apparatus 103-1 to log into the image processing apparatus 103-1. Alternatively, the user 108 can log into the image processing apparatus 103-1 by inserting or presenting a user ID card 109 (FIG. 1) for uniquely identifying the user 108, into or on the user ID authentication apparatus 104 connected to the image processing apparatus 103-1, as illustrated in FIG. 1.

If the user 108 has been previously provided with an authority to use the image processing apparatus 103-1 and previously registered to the image processing apparatus 103-1, the user 108 can successfully log into the image processing apparatus 103-1.

In step S1002, the controller unit 5000 determines whether the user ID and password entered by the user 108 with the login operation in step S1001 match user information that has been previously registered in the image processing apparatus 103-1 and whether the user 108 has been successfully authenticated.

If it is determined in step S1002 that the user 108 has not been successfully authenticated (NO in step S1002), then the controller unit 5000 returns to step S1001 and displays a message on the UI screen for prompting a user to enter a correct user ID and password.

On the other hand, if it is determined in step S1002 that the user 108 has been successfully authenticated (YES in step S1002), then the flow proceeds to step S1003. In step S1003, the controller unit 5000 displays a function selection screen on the touch panel-equipped monitor 908 after the user 108 has logged into the image processing apparatus 103-1 to use the image processing apparatus 103-1.

That is, the UI screen of the touch panel-equipped monitor 908 of the image processing apparatus 103-1 shifts to the copy setting screen 400 (FIG. 9) from the user login screen 300.

At this point, presume a case where the user 108 desires to perform a setting for a copy job for copying ten copies of a document including twenty sheets.

Hereinbelow, the description will be made on the premise that the user 108 has estimated that the copy job for copying ten copies of the document including twenty sheets would be completed in a shorter time if the copy job is performed with two image processing apparatus by a cooperative processing. That is, if the copy job is performed in a cascade copy mode than in the case of performing the copy job with one image processing, the copy job would be performed in less time.

In step S1004, the controller unit 5000 determines whether the user 108 has issued an instruction for performing processing in cooperation with another image processing apparatus. More specifically, in step S1004, the controller unit 5000 determines whether the user 108 has pressed the cooperative processing button 401 via the copy setting screen 400 (FIG. 9).

If it is determined in step S1004 that the user 108 has pressed a button other than the cooperative processing button 401 (NO in step S1004), the process proceeds to step S1019.

If it is determined in step S1004 that the user 108 has pressed the cooperative processing button 401 (YES in step S1004), then the controller unit 5000 determines that the user 108 has designated a function that requires a cooperative processing with another image processing apparatus.

Accordingly, in this case, in step S1005, the controller unit 5000 sends to the device management server 102 the user ID information of the current login user (the user 108) and a notification indicating that the user 108 has designated the cooperative processing.

In step S1006, the device management server 102 issues a request for entry authority information about the user 108 to the entry management server 101 based on the received user ID information about the user 108.

In step S1007, after having received the request for the entry authority information about the user 108 from the device management server 102, the entry management server 101 searches for information about an area that the user 108 can enter (entry authority information). Then, the entry management server 101 sends a result of the search to the device management server 102. Thus, the device management server 102 can acquire the entry authority information corresponding to the user ID information received in step S1005 from the entry management server 101.

In step S1008, the device management server 102 searches for an image processing apparatus that can execute the function requested by the user 108 (e.g., the cooperative processing function) based on the device information (FIG. 2) stored in the device management server 102.

In step S1009, the CPU 2000 of the device management server 102 determines whether an image processing apparatus that can execute the function requested by the user 108 is present, as a result of the search in step S1008.

If it is determined in step S1009 that an image processing apparatus that can execute the function requested by the user 108 is not present (NO in step S1009), then the processing advances to step S1017. On the other hand, if it is determined in step S1009 that an image processing apparatus that can execute the function requested by the user 108 is present (YES in step S1009), then the device management server 102 generates a list of the image processing apparatuses extracted as a result of the search.

In step S1010, the device management server 102 determines whether an image processing apparatus, of the image processing apparatuses listed in the above-described list, is installed in the area for which the user 108 has an entry authority (the area that the user 108 can enter). Here, the information about each image processing apparatus is stored on the HDD 2005 of the device management server 102.

In step S1011, the device management server 102 determines whether an image processing apparatus installed in an area that the user 108 can enter and that can execute the function requested by the user 108 is present. If it is determined in step S1011 that no image processing apparatus installed in an area that the user 108 can enter and that can execute the function requested by the user 108 is present (NO in step S1011), then the process advances to step S1017.

In step S1017, the device management server 102 notifies the image processing apparatus 103-1 that no image processing apparatus installed in an area that the user 108 can enter and that can execute the function requested by the user 108 is present. In step S1018, the controller unit 5000 displays on the screen of the touch panel-equipped monitor 908 only the function that can be executed by the currently operated image processing apparatus by a stand-alone operation.

In step S1019, the currently operated image processing apparatus performs the function requested by the user 108 by a stand-alone operation. Then, the processing ends.

On the other hand, if it is determined in step S1011 that an image processing apparatus installed in an area that the user 108 can enter and that can execute the function requested by the user 108 is present (YES in step S1011), then the process advances to step S1012. In step S1012, the device management server 102 sends to the image processing apparatus 103-1 the list of image processing apparatuses generated in step S1009 and information about whether each of the image processing apparatus in the list is present in the area that the user 108 can enter.

Here, the device management server 102 communicates with the entry management server 101 whose HDD 2005 stores entry authority information about each user with respect to each area. The device management server 102 searches the HDD 2005 according to the requested function and the user information sent from each image processing apparatus.

The device management server 102 includes a function for searching for a cooperative processing destination candidate image processing apparatus from among the image processing apparatuses installed in an area for which the user 108 has an entry authority based on the user information and that can execute the function requested by the user 108 by a cooperative processing with the image processing apparatus currently operated by the user 108.

The device management server 102 can include the function of the entry management server 101.

Alternatively, each of the image processing apparatuses 103-1 through 103-3 can include the function of the entry management server 101 and/or the function of the device management server 102. In this case, the image processing apparatuses 103-1 through 103-3 perform the processing in each step of FIG. 8.

The device management server 102 generates a list of image processing apparatuses that can perform a cooperative processing with a cooperative processing source image processing apparatus, which is to be notified to the cooperative processing source image processing apparatus, according to the cooperation destination candidate image processing apparatuses searched for by the device management server 102. The function for notifying the generated list of cooperative processing destination candidate image processing apparatuses to the cooperative processing source image processing apparatus is the processing in step S1012.

Figure 10:
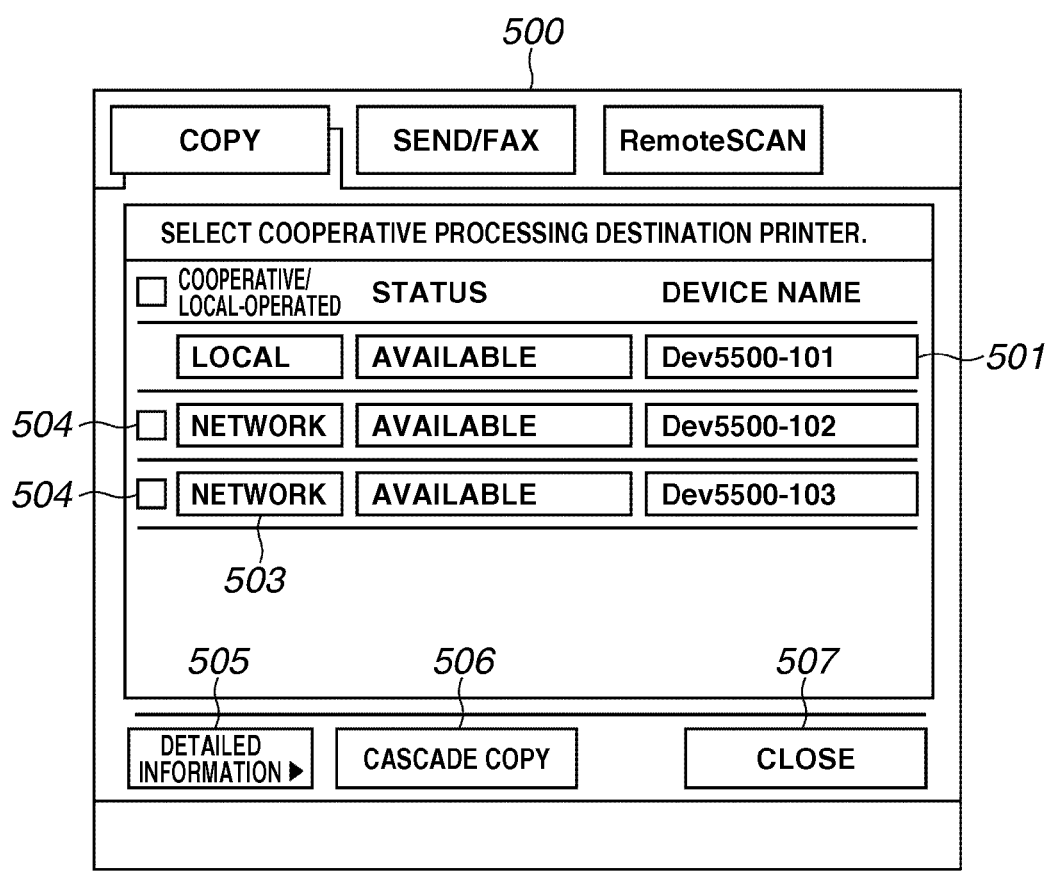
FIG. 10 illustrates an example of a UI screen displayed on the monitor in FIG. 5 according to the first exemplary embodiment of the present invention.

In step S1013, the image processing apparatus 103-1, after having received the list of cooperative processing destination candidate image processing apparatuses from the device management server 102, displays the list of image processing apparatuses that can perform the cooperative processing with the cooperative processing source image processing apparatus, on a UI screen of the touch panel-equipped monitor 908 illustrated in FIG. 10.

Figure 11:
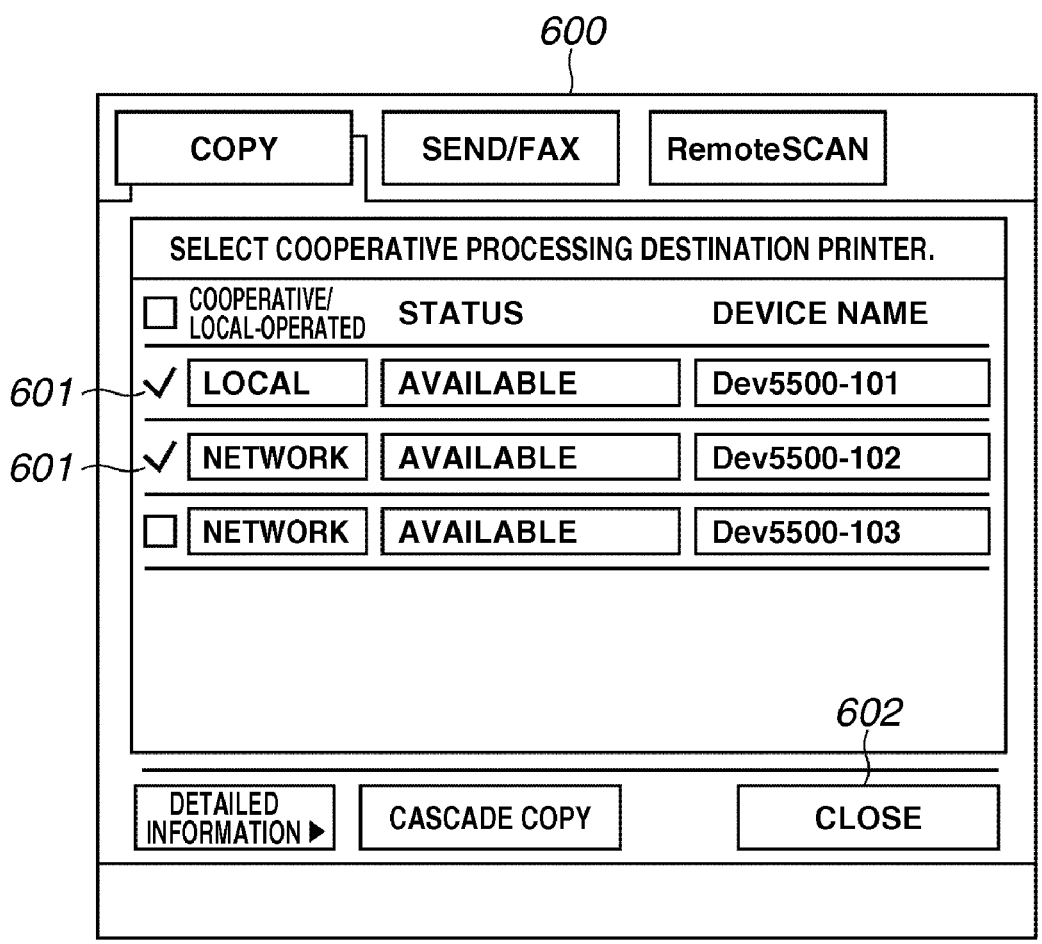
FIG. 11 illustrates an example of a UI screen displayed on the monitor in FIG. 5 according to the first exemplary embodiment of the present invention.
Figure 12:
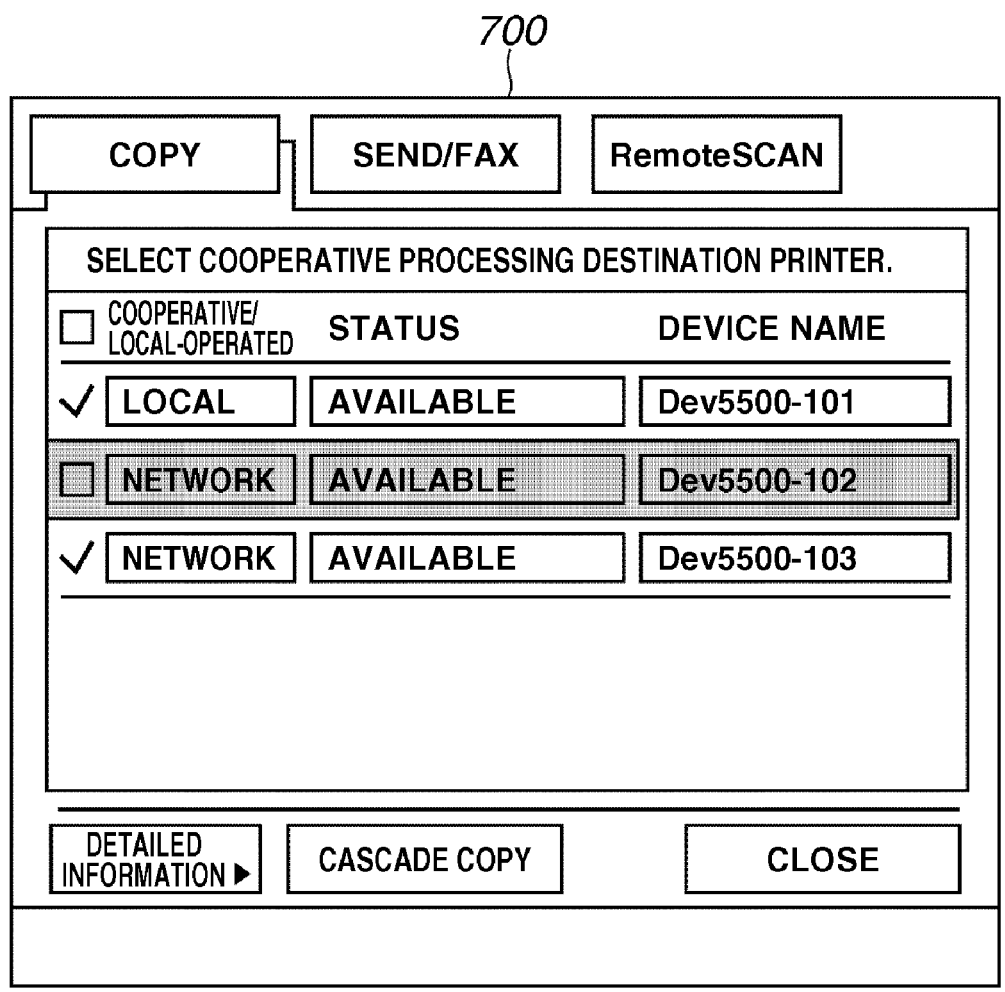
FIG. 12 illustrates an example of a UI screen displayed on the monitor in FIG. 5 according to the first exemplary embodiment of the present invention.

FIGS. 10 through 12 each illustrate an example of a UI screen displayed on the touch panel-equipped monitor 908 (FIG. 5) according to the present embodiment.

The UI screen is a device list screen 500 for displaying the list of the image processing apparatuses that can perform cooperative processing with the cooperative processing source image processing apparatus extracted by the above-described search. The list of cooperative processing destination candidate image processing apparatuses is generated based on the list information that the controller unit 5000 of the image processing apparatus 103-1 acquires from the device management server 102, and is displayed on the device list screen 500 of the touch panel-equipped monitor 908.

In FIG. 10, the user 108 selects an image processing apparatus that the user 108 desires to use as a destination of the cooperative processing, from among the cooperative processing destination candidate image processing apparatuses displayed as a list on the device list screen 500.

Returning to FIG. 8, in step S1014, the controller unit 5000 determines whether any image processing apparatus has been designated by the user 108 as a cooperative processing destination apparatus.

If it is determined in step S1014 that no image processing apparatus has been designated by the user 108 as a cooperative processing destination apparatus (NO in step S1014), then the processing returns to step S1013.

If it is determined in step S1014 that any image processing apparatus has been designated by the user 108 as a cooperative processing destination apparatus (YES in step S1014), then the processing advances to step S1015. In step S1015, the controller unit 5000 performs the cooperative processing with the cooperative processing destination image processing apparatus designated by the user 108.

Here, the cooperative processing refers to processing corresponding to the above-described cascade copy function and a remote copy function, which is a function for sending image data scanned with one image processing apparatus to another image processing apparatus to print the transferred image data with the transfer destination image processing apparatus.

In step S1016, the controller unit 5000 determines whether the cooperative processing with the designated cooperative processing destination image processing apparatus has been completed.

If it is determined in step S1016 that the cooperative processing with the designated cooperative processing destination image processing apparatus has not been completed (NO in step S1016), then the processing returns to step S1015. If it is determined in step S1016 that the cooperative processing with the designated cooperative processing destination image processing apparatus has been completed (YES in step S1016), then the processing ends.

In verifying detailed information about the image processing apparatus on the device list screen 500 on the UI screen illustrated in FIG. 10, the user 108 selects a device name 501 corresponding to an image processing apparatus in the device list and presses a detailed information button 505.

Here, the detailed information includes information about an installation location of the image processing apparatus, a current job status, and system status information (error information and consumables status information).

When the user 108 desires to designate the image processing apparatus 103-2 installed in an adjacent area (the area 111) as a cooperative processing destination image processing apparatus, the user 108 touches a portion of the screen indicating the image processing apparatus 103-2 to check in a check box 504.

In the case of performing a cascade copy, which is one of the cooperative processing according to the present embodiment, the user 108 presses a cascade copy button 506. When the user 108 presses a close button 507, the screen returns to the copy setting screen 400.

FIG. 11 illustrates an example of a UI screen 600 displayed when the user 108 has designated the cascade copy as the cooperative processing and selected a cooperative processing destination image processing apparatus (the image processing apparatus 103-2).

As described above, a cascade copy refers to processing performed with both an image processing apparatus currently operated by the user 108 (the image processing apparatus 103-1) and another image processing apparatus. In the case of performing a cascade copy, a currently operated image processing apparatus (local apparatus) is used as a device for printing out image data.

When the user 108 has pressed the cascade copy button 506, a check box 601 corresponding to the currently operated image processing apparatus (local apparatus) is automatically checked and selected. Then, the user 108 selects another image processing apparatus that is a cooperative processing destination image processing apparatus.

In the case where the user 108 has selected the remote copy as the cooperative processing, that is, when the user has not pressed the cascade copy button 506, a check box 601 corresponding to the currently operated image processing apparatus is not automatically checked. When the user 108 presses a close button 602, the screen returns to the copy setting screen 400.

FIG. 12 illustrates an example of a cooperative processing destination image processing apparatus selection screen 700 displayed when the user 108 has no entry authority for the area in which an image processing apparatus having a device name "Dev5500-102" is installed.

In this case, as illustrated in FIG. 12, a field corresponding to the device having the device name "Dev5500-102" is grayed out. Thus, the user 108 cannot select the field corresponding to the device "Dev5500-102".

Alternatively, the field corresponding to the device "Dev5500-102" may not be displayed at all. However, in the case of using the configuration in which a field corresponding to the device having the device name "Dev5500-102" is grayed out, the user 108 can at least recognize the presence of the device "Dev5500-102".

Figure 13:
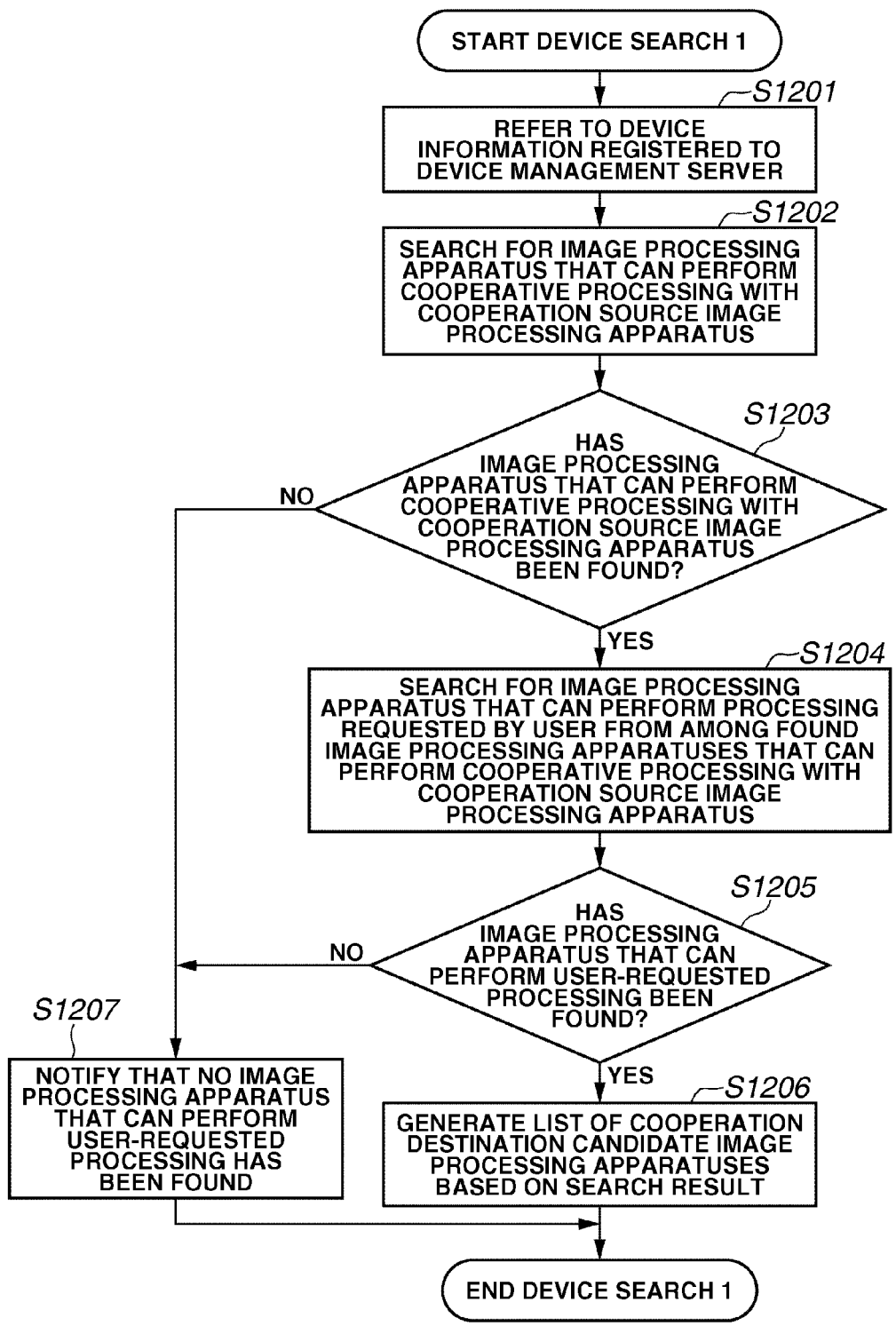
FIG. 13 is a flow chart illustrating an example of data processing performed by a device management server according to the first exemplary embodiment of the present invention.

FIG. 13 is a flow chart illustrating an example of data processing performed by the device management server 102 according to the present embodiment.

The exemplary processing in FIG. 13 is an example of device searching processing that can be implemented by the device management server 102 in step S1010 in FIG. 8. Each step of FIG. 13 can be implemented with the CPU 2000 of the device management server 102 by loading a control program from the HDD 2005 on the RAM 2002.

Referring to FIG. 13, in step S1201, the CPU 2000 refers to the device information previously registered on the HDD 2005 of the device management server 102.

In step S1202, the CPU 2000 searches for an image processing apparatus that can perform cooperative processing with the currently operated image processing apparatus. More specifically, the device management server 102 searches for an image processing apparatus that can execute the image processing function and the cooperative processing requested by the user 108.

In step S1203, the CPU 2000 determines whether an image processing apparatus that can execute the image processing function and the cooperative processing requested by the user 108 is present.

If it is determined in step S1203 that no image processing apparatus that can execute the image processing function and the cooperative processing requested by the user 108 is present (NO in step S1203), then the process advances to step S1207. In step S1207, the CPU 2000 sends a notification to the image processing apparatus 103-1 that it is determined in step S1203 that no image processing apparatus that can execute the image processing function and the cooperative processing requested by the user 108 is present. Then, the processing ends.

On the other hand, if it is determined in step S1203 that an image processing apparatus that can execute the image processing function and the cooperative processing requested by the user 108 is present (YES in step S1203), the process advances to step S1204. In step S1204, the CPU 2000 searches for an image processing apparatus that can execute the function desired by the user 108, from among the image processing apparatuses that can execute the image processing function and the cooperative processing requested by the user 108.

In step S1205, the CPU 2000 determines whether an image processing apparatus that can execute the image processing function requested by the user 108 is present in the image processing apparatuses that can satisfy the above-described search condition.

If it is determined in step S1205 that no image processing apparatus that can execute the function requested by the user 108 is present (NO in step S1205), the process advances to step S1207.

If it is determined in step S1205 that an image processing apparatus that can execute the image processing function requested by the user 108 is present (YES in step S1205), the process advances to step S1206. In step S1206, the CPU 2000 generates a list of device information based on the search result. Then, the processing ends.

As described above, the device management server 102 has a function for acquiring information about a current status of each image processing apparatus installed in respective areas. In addition, the device management server 102 has a function for generating a list of image processing apparatuses that have been excluded from the cooperative processing destination candidate image processing apparatuses based on the state acquired from the image processing apparatus.

Figure 14:
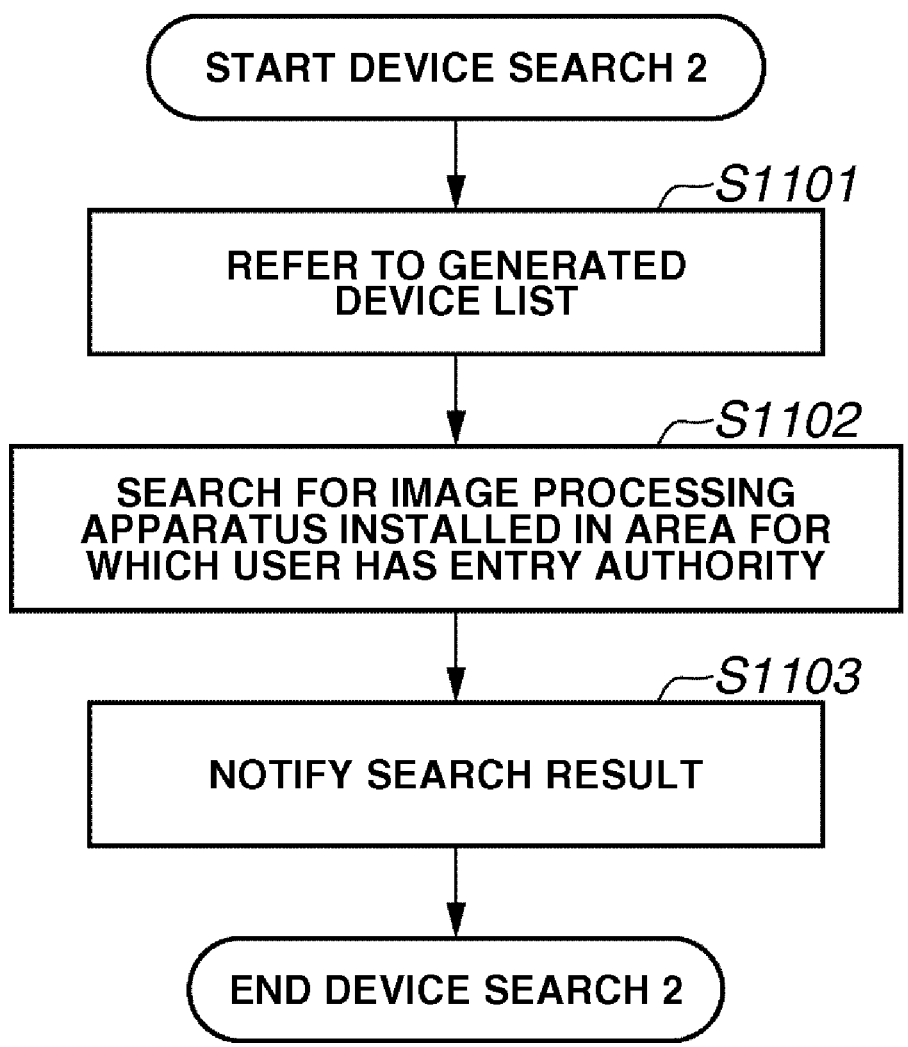
FIG. 14 is a flow chart illustrating an example of data processing performed by the device management server according to the first exemplary embodiment of the present invention.

FIG. 14 is a flow chart illustrating an example of data processing performed by the device management server 102 according to the present embodiment.

The exemplary processing in FIG. 14 is an example of device searching processing that can be implemented by the device management server 102 in step S1008 in FIG. 8. Each step of FIG. 14 can be implemented with the CPU 2000 of the device management server 102 by loading a control program from the HDD 2005 on the RAM 2002.

Referring to FIG. 14, in step S1101, the CPU 2000 refers to the device information of each image processing apparatus listed in the device information list generated in step S1206 of FIG. 13. In step S1102, the CPU 2000 searches for a device installed in the area for which the user 108 corresponding to the authenticated user ID has an entry authority, from among the image processing apparatuses in the device information list.

In step S1103, the CPU 2000 sends to the image processing apparatus 103-1, which is a cooperative processing source image processing apparatus, a result of the search (information about the image processing apparatuses installed in the area for which the user 108 has an entry authority) on the HDD 2005 and the device information list generated in step S1206 in FIG. 13.

Thus, an image processing apparatus that cannot perform the requested image processing can be excluded from the device list. Accordingly, the user 108 can select an image processing apparatus that satisfies the search condition without failure.

Furthermore, if the user 108, who is currently logged into the image processing apparatus 103-1 (the cooperative processing source image processing apparatus), does not have information about the area for which the user has an entry authority, the user 108 can recognize an image processing apparatus that can perform the cooperative processing for executing the requested function from among the notified listed image processing apparatuses.

Here, the image processing apparatuses notified to the user 108 are installed in the area for which the user 108 has an entry authority. Accordingly, the user 108 does not select a wrong image processing apparatus installed in an area for which the user 108 has no entry authority.

As described above, the processing illustrated in the flow charts of FIGS. 13 and 14 is performed by the device management server 102. However, the function of the device management server 102 can be provided to and executed by any of the image processing apparatuses 103-1 through 103-3.

Figure 15:
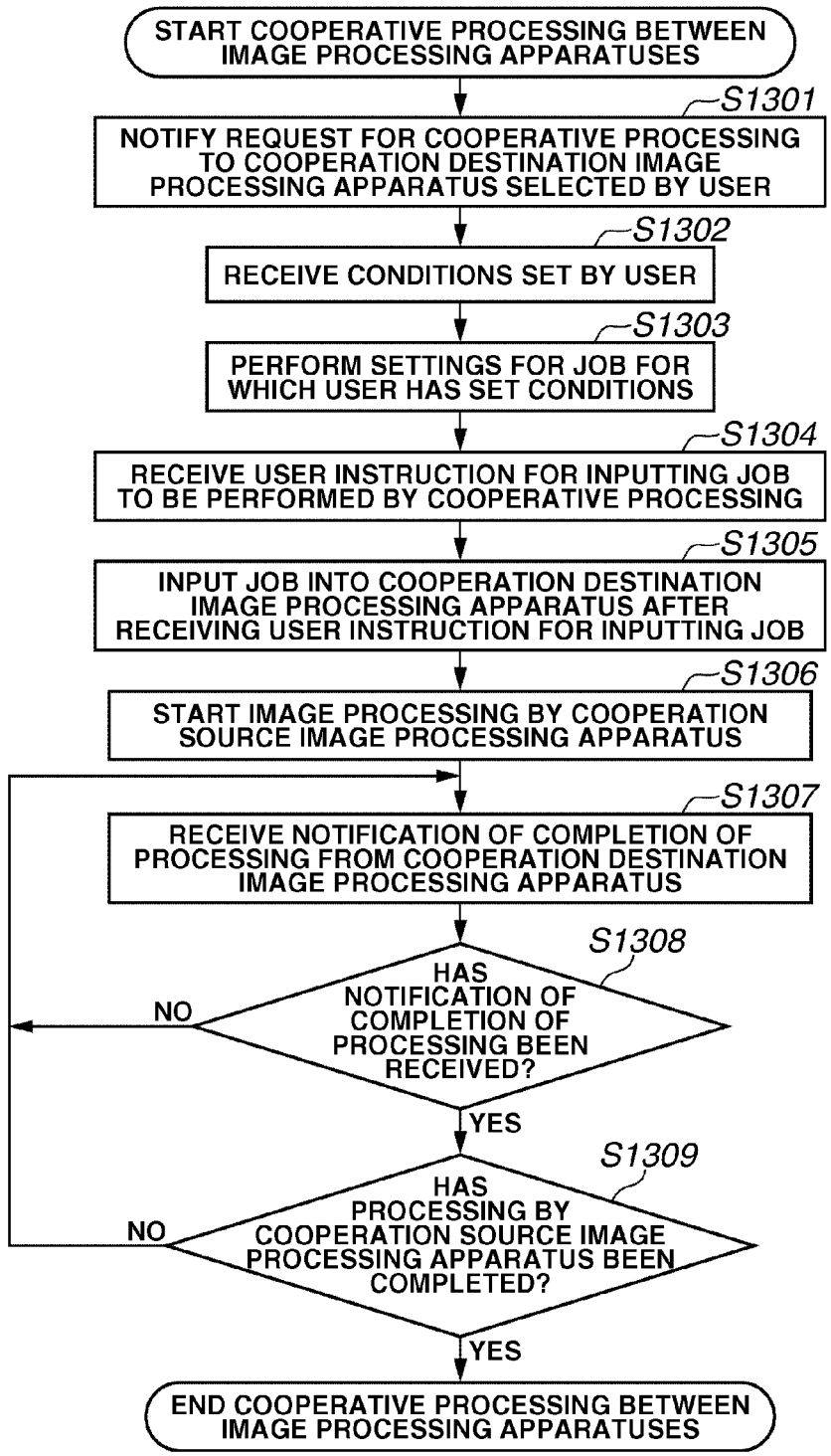
FIG. 15 is a flow chart illustrating an example of data processing performed by an image processing apparatus according to the first exemplary embodiment of the present invention.

FIG. 15 is a flow chart illustrating an example of data processing performed by the image processing apparatus according to the present embodiment.

The processing illustrated in FIG. 15 corresponds to the detailed cooperative processing with another device in step S1015 of FIG. 8. Each step in FIG. 15 can be implemented with the controller unit 5000 by loading a control program from a ROM on a RAM.

Referring to FIG. 15, in step S1301, the controller unit 5000 issues a request for cooperative processing to the image processing apparatus selected by the user 108 on the UI screen of the operation unit 900. For example, in the case where the cooperative processing source image processing apparatus is the image processing apparatus 103-1 and the cooperative processing destination image processing apparatus is the image processing apparatus 103-2, the controller unit 5000 issues a request for the cooperative processing to the image processing apparatus 103-2.

In step S1302, the controller unit 5000 receives an image forming condition set by the user 108 via the operation unit 900. In step S1303, the user 108 performs various settings for the job based on the set image forming condition (including a number of copies, a paper size, information about two-sided or one-sided printing, and a layout).

In step S1304, the controller unit 5000 receives the job to be performed and input by the user 108 via the operation unit 900 into the image processing apparatus 103-1, which is a cooperative processing source image processing apparatus. In step S1305, the controller unit 5000 inputs the job into the cooperative processing destination image processing apparatus via the network after the job has been input.

In step S1306, the controller unit 5000 starts the image processing performed by the image processing apparatus 103-1, which is a currently operated image processing apparatus. In step S1307, the controller unit 5000 receives a notification of completion of the image processing from the image processing apparatus 103-2, which is a cooperative processing destination image processing apparatus.

In step S1308, the controller unit 5000 determines whether the image processing apparatus 103-1 has received the notification of completion of the image processing from the image processing apparatus 103-2, which is a cooperative processing destination image processing apparatus.

If it is determined in step S1308 that the image processing apparatus 103-1 has not received the notification of completion of the image processing from the image processing apparatus 103-2 yet (NO in step S1308), the process returns to step S1307.

On the other hand, if it is determined in step S1308 that the image processing apparatus 103-1 has received the notification of completion of the image processing from the image processing apparatus 103-2 (YES in step S1308), the process advances to step S1309. In step S1309, the controller unit 5000 determines whether the image processing by the image processing apparatus 103-1, which is the currently operated image processing apparatus, has been completed.

If it is determined in step S1309 that the image processing by the image processing apparatus 103-1 has not been completed yet (NO in step S1309), the process returns to step S1307. If it is determined in step S1309 that the image processing by the image processing apparatus 103-1 has been completed (YES in step S1309), the processing ends.

An entry management system in the image processing system in FIG. 1 will now be described below.

In the following description, an "administrator" refers to and is as a person who manages and monitors an entry into an area, such as an office room or a meeting room, or an office building. A "user" refers to a person who utilizes and enters an area, for which entry management and control by the administrator is performed. A user is registered to the entry management server 101 by the administrator.

A flow of processing for registering a user to the entry management server 101 is described below with reference to FIG. 16.

Figure 16:
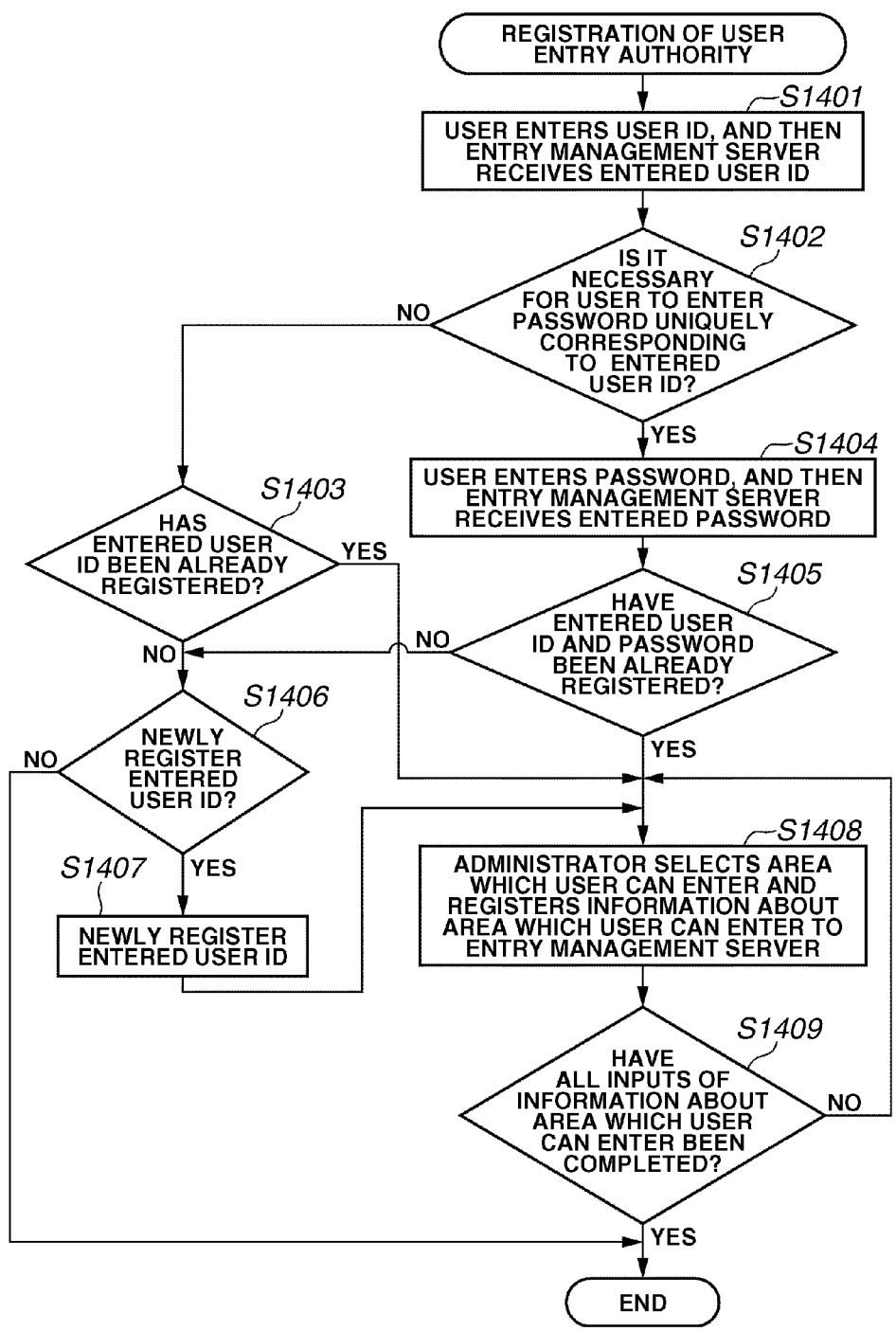
FIG. 16 is a flow chart illustrating an example of data processing performed by the device management server according to the first exemplary embodiment of the present invention.

FIG. 16 is a flow chart illustrating an example of data processing performed by the entry management server 101 according to the present embodiment.

The example in FIG. 16 is processing for registering a user to the entry management server 101 performed by the entry management server 101. Each step of FIG. 16 can be implemented with the CPU 2000 of the device management server 102 by loading a control program from the HDD 2005 on the RAM 2002.

Referring to FIG. 16, in step S1401, the administrator operates the keyboard 2006 of the terminal apparatus 113 and enters a user ID of the user to be newly registered to the entry management server 101.

As illustrated in FIG. 1, it is useful to use the terminal apparatus 113 as an input apparatus for entering the user ID.

In step S1402, the CPU 2000 of the entry management server 101 determines whether it is necessary to enter a password uniquely corresponding to the entered user ID according to the form of use of the entry management system.

If it is determined in step S1402 that it is not necessary to enter a password uniquely corresponding to the entered user ID (NO in step S1402), the process advances to step S1403. In step S1403, the CPU 2000 determines whether the entered user ID matches the already registered ID.

If it is determined in step S1403 that the entered user ID matches the already registered ID (YES in step S1403), the process advances to step S1408. If it is determined in step S1403 that the entered user ID has not been registered yet (NO in step S1403), the process advances to step S1406. In step S1406, the CPU 2000 displays a message on the UI screen to the administrator for verifying whether to newly register the entered ID.

If it is determined in step S1406 that the administrator has issued an instruction for not registering the entered ID (NO in step S1406), the processing ends.

On the other hand, if it is determined in step S1406 that the administrator has issued an instruction for newly registering the entered ID (YES in step S1406), the process advances to step S1407. In step S1407, the CPU 2000 registers the entered user ID in a user management table stored on the HDD 2005. Then, the processing advances to step S1408.

On the other hand, if it is determined in step S1402 that it is necessary to enter a password, for example, for an entry management (YES in step S1402), the process advances to step S1404. In step S1404, the user enters the password via the terminal apparatus 113.

In step S1405, the entry management server 101 determines whether the entered user ID and password have been registered in the user management table on 2005 of the entry management server 101.

If it is determined in step S1405 that the entered user ID and password have not been registered in the user management table on 2005 of the entry management server 101 (NO in step S1405), the processing advances to step S1406. On the other hand, if it is determined in step S1405 that the entered user ID and password have been registered in the user management table on 2005 of the entry management server 101 (YES in step S1405), the processing advances to step S1408. In step S1408, the administrator selects an area that the user can enter.

When the administrator has completely input the area that the user can enter in step S1408, the entry management server 101 stores information about the area that the user can enter on the HDD 2005 of the entry management server 101.

In step S1409, the CPU 2000 of the entry management server 101 determines whether all the inputs have been performed. If it is determined in step S1409 that all the inputs have not been performed (NO in step S1409), then the processing returns to step S1408. On the other hand, if it is determined in step S1409 that all the inputs have been performed (YES in step S1409), the processing ends.

User authentication processing performed when a user desires to enter an area for which an entry management have been performed according to the present embodiment will now be described.

Figure 17:
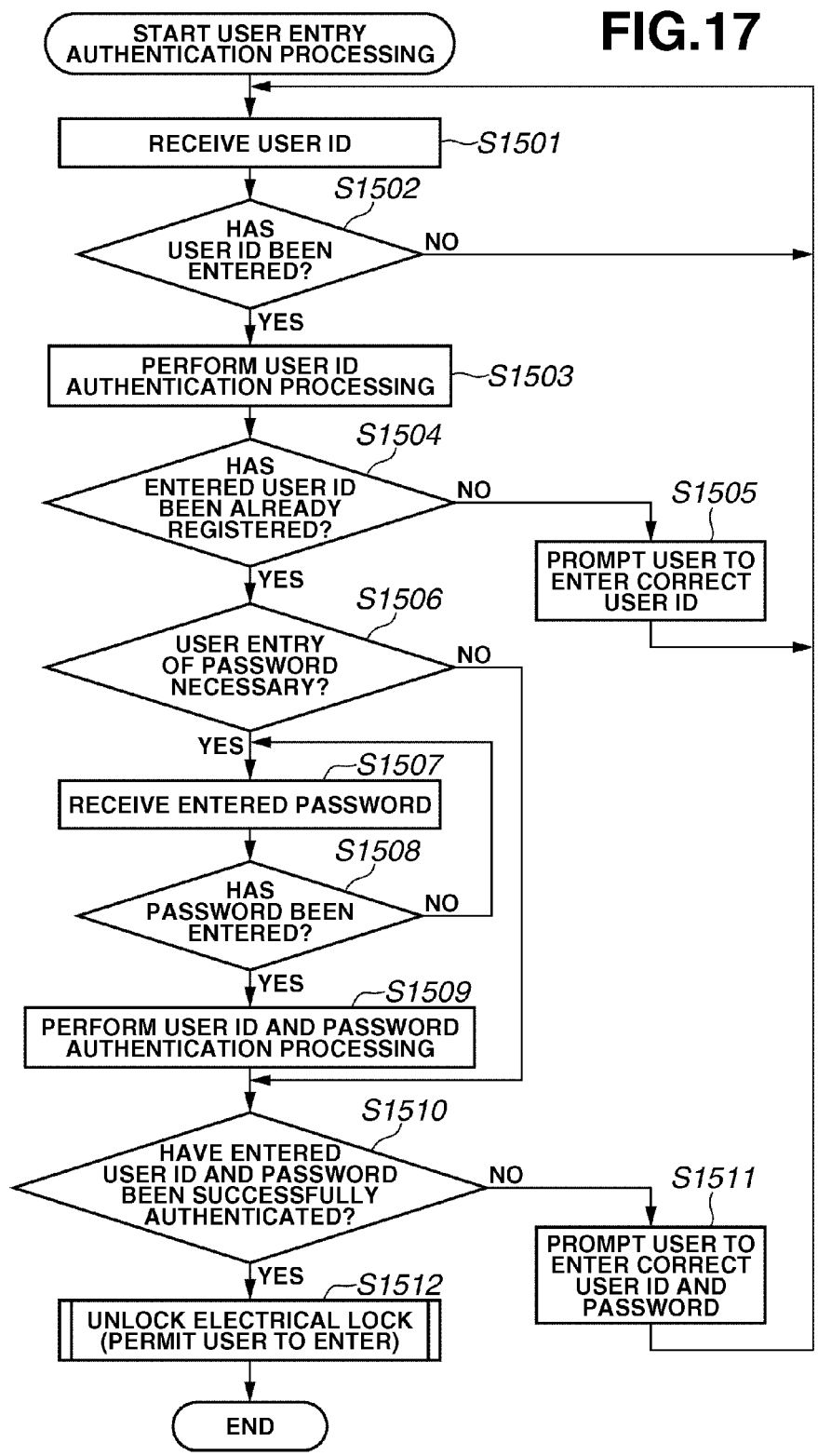
FIG. 17 is a flow chart illustrating an example of data processing performed by the device management server according to the first exemplary embodiment of the present invention.

FIG. 17 is a flow chart illustrating an example of data processing performed by the entry management server 101 according to the present embodiment.

The exemplary processing in FIG. 17 is user registration processing performed by the entry management server 101. Each step of FIG. 17 can be implemented with the CPU 2000 of the device management server 102 by loading a control program from the HDD 2005 on the RAM 2002.

Referring to FIG. 17, when a user enters a user ID at a door to the area for which an entry management has been performed, then in step S1501, the entry management user ID reader 106, which is installed at the door to the entry-managed area receives the entered user ID.

In step S1502, the CPU 2000 determines whether the user ID have been entered. If it is determined in step S1502 that the user ID has not been entered yet (NO in step S1502), the process returns to step S1501.

Note that such a configuration can be employed that a user ID card having information unique to a user is provided to each user and the user having the user ID card can input information unique to the user by inserting or presenting the ID card into or on the entry management user ID reader 106, by a contact recognition method (magnetic recognition method) or by a non-contact recognition method utilizing radio frequency identification (RFID), such as FeliCa®. In addition, in the case where an input device is installed to the area, the user can manually enter a user ID.

If it is determined in step S1502 that the user ID has been entered (YES in step S1502), the process advances to step S1503. In step S1503, the CPU 2000 of the entry management server 101 performs user authentication processing by collating the entered user ID with the previously registered user ID information.

In step S1504, the CPU 2000 determines whether the entered user ID has been registered. If it is determined in step S1504 that the entered user ID has not been registered yet (NO in step S1504), the process advances to step S1505. In step S1505, the CPU 2000 issues a request to the image processing apparatus 103-1 for prompting the user to enter a correct user ID and password. Then, the process returns to step S1501.

If it is determined in step S1504 that the entered user ID has been already registered (YES in step S1504), the process advances to step S1506. In step S1506, the CPU 2000 determines whether it is necessary to enter a password in addition to the user ID to enhance the data security.

Whether it is necessary to enter a password can be determined according to the presence or absence of a setting that can be previously performed as to whether an authentication for an entered password is to be performed, as one of security conditions previously set for the entry management server 101.

If it is determined in step S1506 that it is not necessary to enter a password (NO in step S1506), the process advances to step S1510. If it is determined in step S1506 that it is necessary to enter a password (YES in step S1506), the process advances to step S1507.

In step S1507, after the user has entered the password at the door to the entry-managed area, the entry management user ID reader 106, which is installed at the door to the entry-managed area, receives the entered password.

In step S1508, the CPU 2000 of the entry management server 101 determines whether the password has been entered.

If it is determined in step S1508 that the password has not been entered (NO in step S1508), the process returns to step S1507. If it is determined in step S1508 that the password has been entered (YES in step S1508), the process advances to step S1509. In step S1509, the CPU 2000 of the entry management server 101 performs an authentication of the entered user ID and password.

In step S1510, the CPU 2000 of the entry management server 101 determines whether the entered user ID and password match the registered password corresponding to the registered user ID (that is, whether the entered user ID and password can be successfully authenticated).

If it is determined in step S1510 that the password has not been registered (NO in step S1510), the process advances to step S1511. In step S1511, the CPU 2000 issues a request to the image processing apparatus 103-1 for displaying a message for prompting the user to enter a correct user ID and password, and then the process returns to step S1501.

If it is determined in step S1510 that the entered user ID and password have matched the registered user ID and password (that is, that the entered user ID and password can be successfully authenticated) (YES in step S1510), the process advances to step S1512. In step S1512, the electrical lock 107 unlocks. Then, the processing ends. The processing for unlocking the electrical lock 107 is described below.

As described above, in the present embodiment, when the user enters a user ID to enter each of the areas 110 through 112, the entry management user ID reader 106 sends the user ID information to the entry management server 101 via the network 105 (FIG. 1). Alternatively, the user ID information can be directly sent from the entry management user ID reader 106 to the entry management server 101, instead of sending the user ID via the network 105.

Then, the entry management server 101 determines whether the entered user ID has been registered. If it is determined that the user ID has not been registered, then the CPU 2000 issues a request to the image processing apparatus 103-1 for displaying a message for prompting the user to enter a correct user ID.

The entry management server 101 issues an instruction for unlocking to the electrical lock 107 of each of the areas 110 through 112 only when the user has entered a registered user ID (or a registered user ID and password). That is, the entry management server 101 performs control such that the electrical lock 107 is unlocked for a registered user only.

Figure 18:
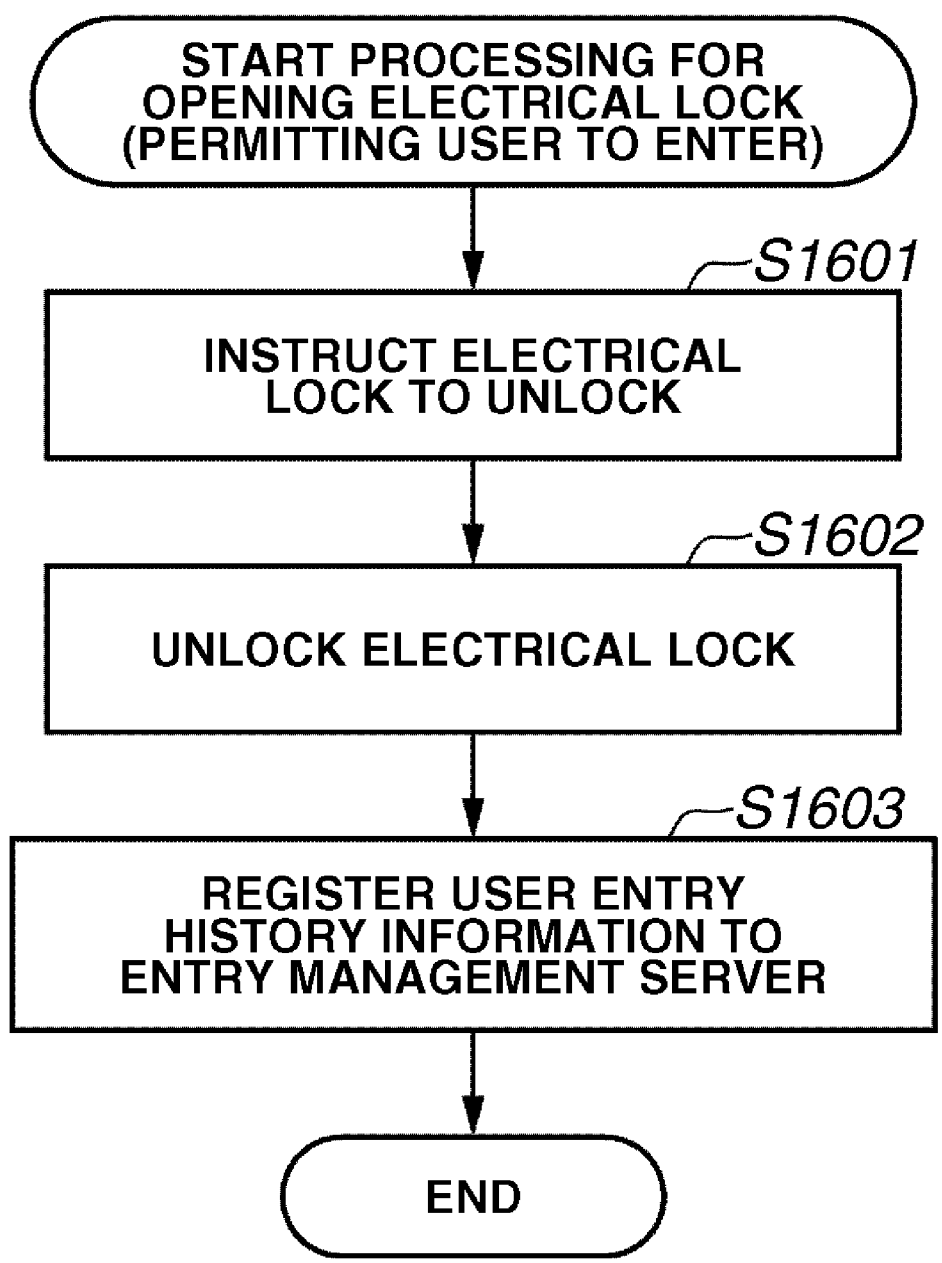
FIG. 18 is a flow chart illustrating an example of data processing performed by the device management server according to the first exemplary embodiment of the present invention.

FIG. 18 is a flow chart illustrating an example of data processing performed by the entry management server 101 according to the present embodiment.

The exemplary processing in FIG. 18 is processing for registering a user to the entry management server 101. Each step of FIG. 18 can be implemented with the CPU 2000 of the device management server 102 by loading a control program from the HDD 2005 on the RAM 2002.

Referring to FIG. 18, in step S1601, the CPU 2000 directly issues an instruction for unlocking to the electrical lock 107 or via a network (not illustrated) or via the entry management user ID reader 106 (FIG. 1).

In step S1602, the electrical lock 107, after having received the instruction for unlocking from the entry management server 101, is physically unlocked (the door is unlocked).

In step S1603, the electrical lock 107 sends a notification indicating that the electrical lock 107 has already been unlocked, directly to the entry management server 101 or via a network (not illustrated) or via the entry management user ID reader 106 (FIG. 1). Then, the entry management server 101, after it is determined that the user has entered the unlocked area, registers entry history information to the entry management server 101 and stores the registered entry history information in the entry management server 101. Then, the processing ends.

As described above, the entry management server 101 can manage information about a current location of the user and entry history information for the user.

According to the above-described embodiment, when the user performs an operation for outputting an image to an image processing apparatus other than the local apparatus (the image processing apparatus that the user currently operates) in the case of a cooperative processing, such as a cascade copy or a remote copy, the user can be prevented from selecting an image processing apparatus installed in an area for which the user has no entry authority by mistake. Accordingly, it can be prevented that the user cannot enter an area to pick up a print product.

In the above-described embodiment, the user selects a function for processing a job by cooperative processing with an image processing apparatus other than the local apparatus, via a UI screen displayed on the currently operated image processing apparatus. Furthermore, after the function has been selected by the user, the entry management server 101 sends the user ID information and the information about the function requested by the user to the device management server 102.

In a second exemplary embodiment, the entry management server 101 sends the user ID information to the device management server 102 when the user has logged into any one of the image processing apparatuses 103-1 through 103-3.

That is, with such a configuration that the entry management server 101 sends the user ID information to the device management server 102 when the user has logged into the image processing apparatus (the image processing apparatuses 103-1 through 103-3), the device management server 102 can search for an image processing apparatus installed in the area for which the user has an entry authority immediately after receiving the user ID information sent from the entry management server 101. Thus, a time lag that can arise in displaying the device list on the UI screen can be shortened.

In the above-described exemplary embodiments, the image processing apparatuses installed in an area for which the user has no entry authority cannot be selected by the user and the list of cooperative processing destination candidate image processing apparatuses, which are managed by the device management server 102 and can be selected as a cooperative processing destination image processing apparatus, is displayed on a UI screen of a cooperative processing source image processing apparatus.

However, there may be a case where the user desires to output a job without entering an area for which the user has no entry authority, with an image processing apparatus installed in the entry-inhibited area.

In this case, the user requests processing of a job to the image processing apparatus installed in the entry-inhibited area without entering the entry-inhibited area, to acquire job-processed data that has been subjected to the job processing.

In addition, there may be a case where the user desires to output the acquired job-processed data with an image processing apparatus installed in an area for which the user has an entry authority. In this case, it is useful that the image processing apparatus installed in the entry-inhibited area displays a list of image processing apparatuses that can be selected by the user.

In this regard, in the present embodiment, if a requested job does not require the user to enter an entry-inhibited area, the image processing apparatuses installed in the entry-inhibited area are displayed as cooperative processing destination candidate image processing apparatuses. The job that does not require the user to enter an entry-inhibited area includes a facsimile transmission job and an image editing processing job (processing in which image-edited data is sent back to the local apparatus).

Figure 19B:
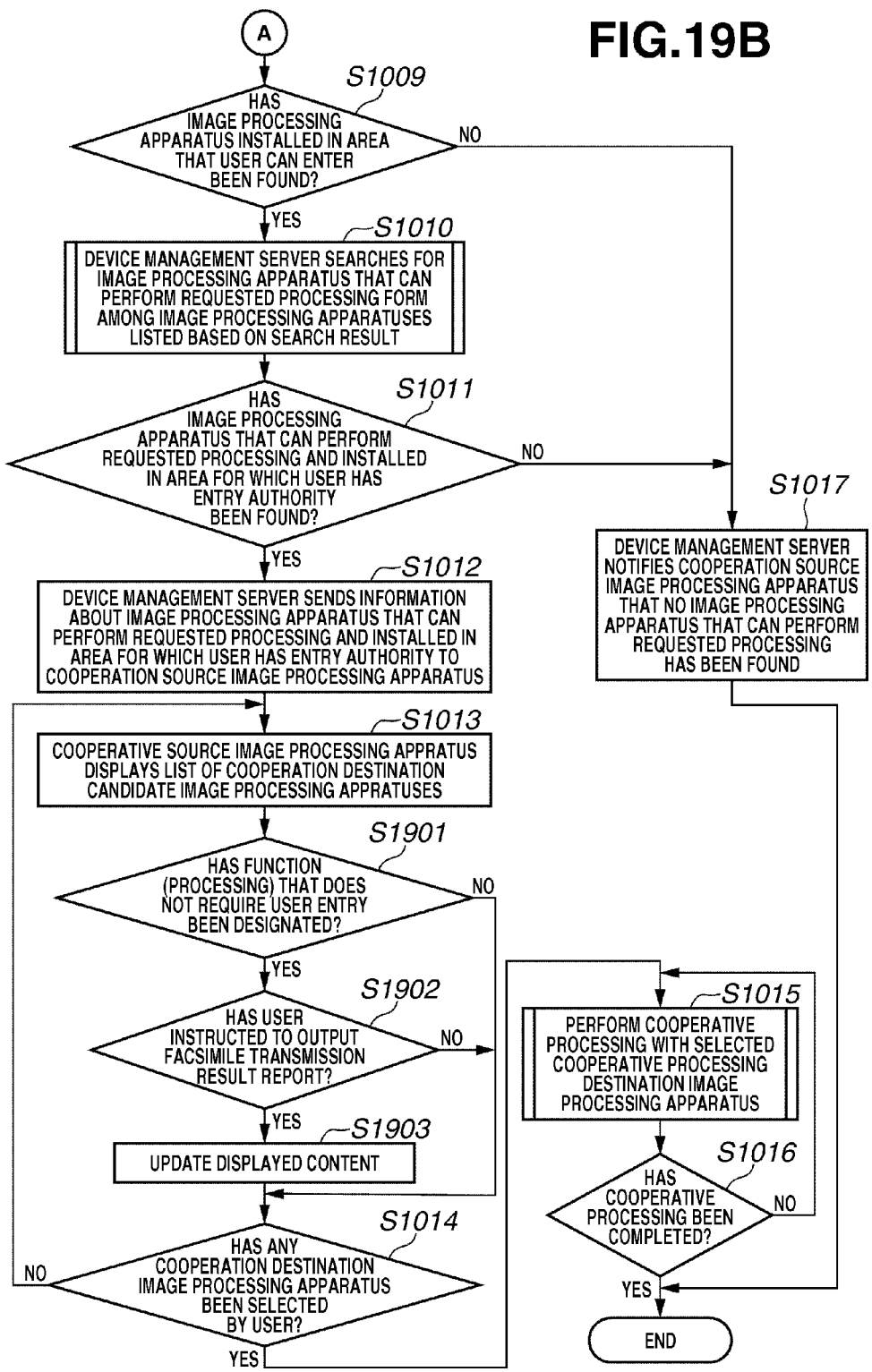
FIG. 19B is a flow chart illustrating an example of data processing performed by the image processing system according to the third exemplary embodiment of the present invention.

FIGS. 19A and 19B are flow charts each illustrating an example of data processing performed by the image processing system according to the present embodiment.

The processing in FIGS. 19A and 19B can be performed by the image processing apparatus (the image processing apparatuses 103-1 through 103-3) and the device management server 102 constituting the image processing system. Each of the image processing apparatuses 103-1 through 103-3 according to the present embodiment is installed in respective areas in the state illustrated in FIG. 1. In this state, the user has no entry authority for entering the area 111.

Here, steps S1001 through S1017 are similar to those illustrated in FIG. 8. Accordingly, these steps are provided with the same reference numerals, and the detailed description thereof is not repeated here. Steps S1901 through S1903 characterize the present embodiment. Each step in FIG. 19A and FIG. 19B can be implemented with the controller unit 5000 by loading a control program from a ROM on a RAM. Furthermore, each step in FIG. 19A and FIG. 19B can be implemented with the CPU 2000 of the device management server 102 by loading a control program from the ROM 2001 on the RAM 2002.

Hereinbelow, description of the steps similar to those in FIG. 8 will not be repeated, and only steps S1901 through S1903 will be described.

Figure 20:
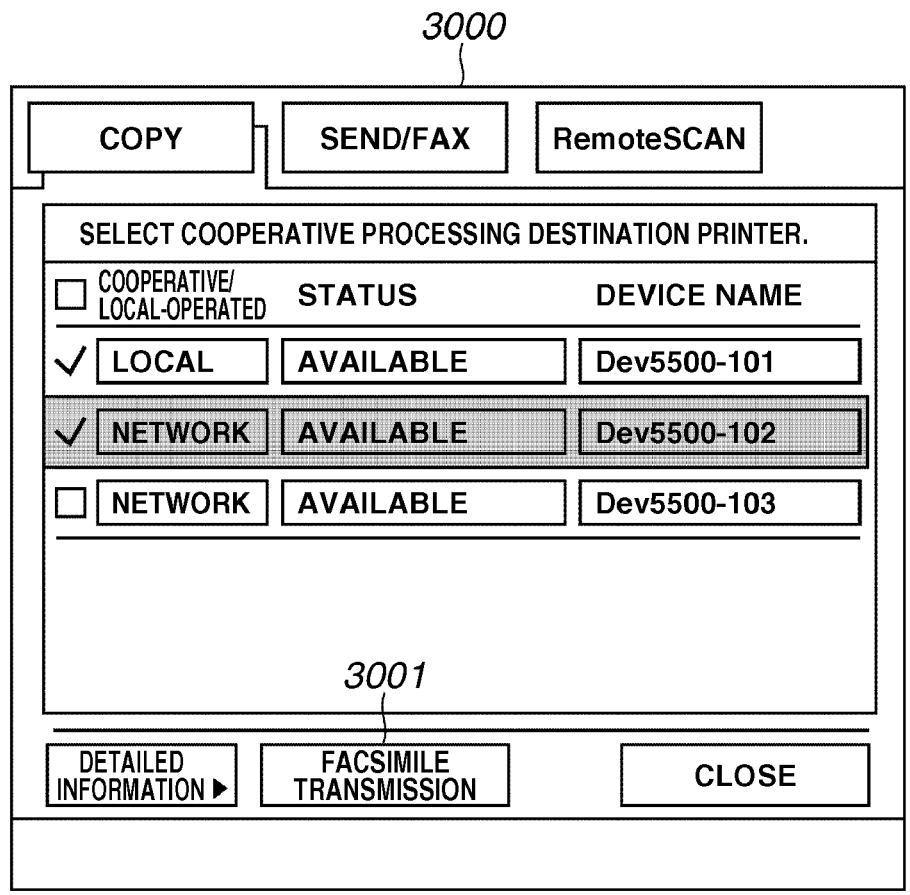
FIG. 20 illustrates an example of a configuration of a UI screen displayed on the monitor in FIG. 5 according to the third exemplary embodiment of the present invention.

In step S1013, the controller unit 5000 displays a display screen 3000 (FIG. 20) on the touch panel-equipped monitor 908. In the screen 3000 in FIG. 20, a field corresponding to the image processing apparatus, which has a device name "Dev5500-102" and installed in the entry-inhibited area, is grayed out. Thus, the field for the "Dev5500-102" cannot be selected by the user as a cooperative processing destination image processing apparatus.

In step S1901, the controller unit 5000 determines whether the user has selected a function that does not require an entry into an entry-inhibited area. More specifically, the controller unit 5000 determines whether the user has pressed a facsimile transmission button 3001 via the screen 3000 in FIG. 20.

The facsimile transmission function that can be designated by the user by operating the facsimile transmission button 3001 refers to a function for sending the data scanned with the scanner unit 10 of the image processing apparatus 103-1 that is currently operated by the user to another image processing apparatus and transmitting to an external apparatus the data sent to the cooperative processing destination image processing apparatus, using a facsimile transmission unit provided to the cooperative processing destination image processing apparatus.

With the above-described configuration, in the case where the image processing apparatus 103-1, which is currently operated by the user, does not include a facsimile transmission function, the data can be sent by facsimile transmission. In addition, with the above-described configuration, it is not necessary for the user to move to an installation location of the cooperative processing destination image processing apparatus to which the data is sent by facsimile transmission. That is, the function does not require an entry into an entry-inhibited area.

In the present embodiment, the facsimile transmission function is described as an example of a function that does not require the user to enter an entry-inhibited area. However, the function that does not require the user to enter an entry-inhibited area can include a function other than the above-described function.

If it is determined in step S1901 that the user has pressed the facsimile transmission button 3001 (FIG. 20) (YES in step S1901), then the controller unit 5000 inquires of the user whether to output a result report of the facsimile transmission. Then the processing advances to step S1902. If it is determined in step S1901 that the user has not pressed the facsimile transmission button 3001 (No in step S1901), then the processing advances to step S1014.

In step S1902, the controller unit 5000 determines whether the user has instructed to output a facsimile transmission result report. More specifically, the controller unit 5000 determines which of a soft key "YES" (not illustrated) or a soft key "NO" (not illustrated) is pressed by the user, when a UI screen for prompting the user to select whether to output the result report is displayed with a message such as "Output a result report?".

If it is determined in step S1902 that the user has pressed the "YES" key (YES in step S1902), then the processing advances to step S1903. If it is determined in step S1902 that the user has pressed the "NO" key (NO in step S1902), then the processing advances to step S1014.

Alternatively, if it is determined in step S1902 that the user has pressed the "YES" key, a screen for selecting an image processing apparatus for displaying the result report can be displayed. In this case, the image processing apparatus installed in the area for which the user has an entry authority is displayed. The image processing apparatus selected by the user via the screen prints out the result report.

Figure 21:
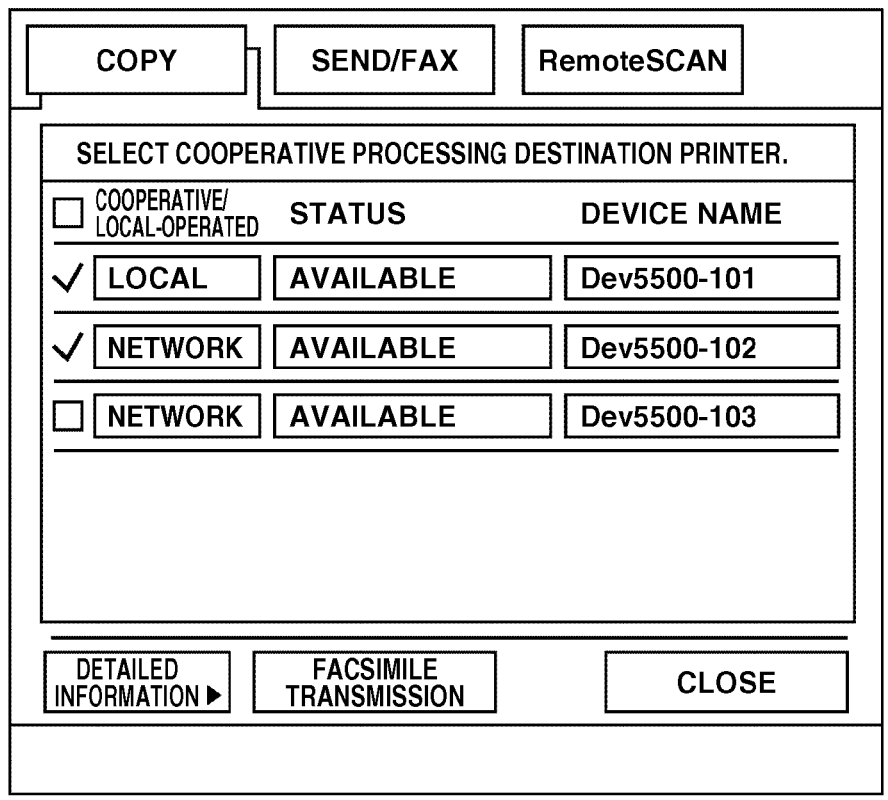
FIG. 21 illustrates an example of a configuration of a UI screen displayed on the monitor in FIG. 5 according to the third exemplary embodiment of the present invention.

In step S1903, the controller unit 5000 displays a screen illustrated in FIG. 21 on the touch panel-equipped monitor 908. That is, the controller unit 5000 restores an initial ordinary state of the display of the image processing apparatus having the device name "Dev5500-102" installed in the entry-inhibited area from the gray-out state, and thus the user can select the image processing apparatus having the device name "Dev5500-102" as a cooperative processing destination image processing apparatus.

In step S1903, the controller unit 5000 also determines whether the selected image processing apparatus includes a facsimile transmission function. If it is determined in step S1903 that the selected image processing apparatus does not have the facsimile transmission function (NO in step S1903), then the display continues to be grayed out, and thus the user cannot select the image processing apparatuses as a cooperative processing destination image processing apparatus. Then, the processing advances to step S1014.

As described above, according to the present embodiment, whether the image processing apparatus installed in an entry-inhibited area can be selected by the user is changed according to the content of the processing requested by the user, instead of simply inhibiting the user from selecting the image processing apparatus installed in the entry-inhibited area.

More specifically, if the processing does not require an entry into the entry-inhibited area, the user can select the image processing apparatus installed in the entry-inhibited area as a cooperative processing destination image processing apparatus.

Accordingly, the user can select an appropriate image processing apparatus as a cooperative processing destination image processing apparatus. Thus, the user convenience can be improved.

In the above-described third exemplary embodiment, the user can select the image processing apparatus installed in an entry-inhibited area, and the determination therefor is made based on whether the user has designated the processing that does not require the user to enter the entry-inhibited area.

Furthermore, in the third exemplary embodiment, the facsimile transmission processing and the image editing processing are described as examples of the processing that does not require an entry into the entry-inhibited area. In these processing, the data is not printed out by the cooperative processing destination image processing apparatus.

However, in the case where the data is printed out by the cooperative processing destination image processing apparatus, the user who has requested the processing may not always pick up a print product. For example, the user can send a job to the cooperative processing destination image processing apparatus to allow another user present in an area where the requesting user cannot enter to print out the transferred data, instead of sending a document via a facsimile transmission.

The above-described remote copy function can be used for such a purpose.

On the other hand, in the case of the above-described cascade copy function, a plurality of image processing apparatuses are utilized in parallel to each other to perform processing of one job. Accordingly, in this case, it is likely that the user picks up a print product printed by the cooperative processing destination image processing apparatus.

In this regard, in the present embodiment, whether to display the image processing apparatuses installed in the entry-inhibited area as cooperative processing destination candidate image processing apparatuses is determined based on whether the processing requested by the user is the cascade copy or the remote copy.

In the present embodiment, when the user operates the screen in FIG. 9 and presses the cooperative processing button 401, the device list screen 500 (FIG. 10) is displayed.

At this time, if the image processing apparatus that can perform the cooperative processing is installed in an entry-inhibited area, the image processing apparatus is not displayed in a gray-out state, so that the image processing apparatus installed in the entry-inhibited area can be selected as a cooperative processing destination image processing apparatus.

In this case, when the user presses the cascade copy button 506, the image processing apparatus installed in the entry-inhibited area is displayed in a gray-out state, so that the user cannot select the image processing apparatus installed in the entry-inhibited area.

Hereinbelow, the configuration of a data processing program that can be read by an image forming system including an information processing apparatus and a server apparatus according to an exemplary embodiment of the present invention is described with reference to memory maps illustrated in FIG. 22 and FIG. 23.

FIG. 22 illustrates a memory map of a storage medium that stores various data processing programs that can be read by an information processing apparatus according to an exemplary embodiment of the present invention.

FIG. 23 illustrates a memory map of a storage medium that stores various data processing programs that can be read by a server apparatus according to an exemplary embodiment of the present invention.

Although not illustrated in FIG. 22 and FIG. 23, information for managing the programs stored in the storage medium such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. In addition, in the case where a program to be installed is compressed, a program for decompressing the compressed program can be stored in the storage medium.

In addition, the functions according to the above-described exemplary embodiments illustrated in FIGS. 8, 13, 14 through 18, 19A, and 19B can be implemented by a host computer using a program that is externally installed. In this case, the present invention is applied to the case where a group of information including a program is supplied to an output device from a storage medium such as a compact disk-read only memory (CD-ROM), a flash memory, and a floppy disk (FD) or from an external storage medium through a network.

The present invention can also be achieved by providing a system or an apparatus with a storage medium storing software program code implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

Accordingly, the program can be configured in any form, such as object code, a program executed by an interpreter, and script data supplied to an OS.

As the storage medium for supplying such program code, a floppy disk, a hard disk, an optical disk, a magneto-optical disk, a magnetooptic disk (MO), a CD-ROM, a compact disk recordable (CD-R), a compact disk rewritable (CD-RW), a magnetic tape, a nonvolatile memory card, a read-only memory (ROM), and a digital versatile disc (DVD (DVD-read only memory (DVD-ROM) and DVD-rewritable (DVD-RW)), for example, can be used.

In this case, the program code itself, which is read from the storage medium, implements the function of the embodiments mentioned above, and accordingly, the storage medium storing the program code constitutes the present invention.

The above program can also be supplied by connecting to a web site on the Internet by using a browser of a client computer and by downloading the program from the web site to a storage medium such as a hard disk. In addition, the above program can also be supplied by downloading a compressed file that includes an automatic installation function from the web site to a storage medium such as a hard disk.

The functions of the above embodiments can also be implemented by dividing the program code into a plurality of files and downloading each divided file from different web sites. That is, a World Wide Web (WWW) server and a file transfer protocol (ftp) server for allowing a plurality of users to download the program file for implementing the functional processing configures the present invention.

In addition, the above program can also be supplied by distributing a storage medium such as a CD-ROM and the like which stores the program according to the present invention after an encryption thereof; by allowing the user who is qualified for a prescribed condition to download key information for decoding the encryption from the web site via the Internet; and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in an exemplary embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-279634 filed Oct. 13, 2006, which is hereby incorporated by reference herein in its entirety.

What is claimed is:

1. An image processing system including a plurality of image processing apparatuses and an information processing apparatus configured to manage each image processing apparatus, each of the plurality of image processing apparatuses being installed in any of a plurality of areas, and each of the plurality of image processing apparatuses and the information processing apparatus being in communication with each other,
wherein the information processing apparatus comprises:
a first storage unit configured to store information about each of the image processing apparatuses;
a second storage unit configured to store entry authority information about each user, wherein the entry authority information indicates an area for which a user has an entry authority and an area for which the user does not have an entry authority;
a receiving unit configured to receive user information for identifying a user;
a searching unit configured to search for an image processing apparatus that is able to satisfy a received search condition, based on the information stored in the first storage unit; and
an output unit configured to output a result of the search by the searching unit, wherein each of the plurality of image processing apparatuses comprises:
a search condition sending unit configured to send a search condition for searching another image processing apparatus to the information processing apparatus;
a user information sending unit configured to send entered user information to the information processing apparatus; and
a display unit configured to display the search result outputted by the output unit,
wherein the searching unit is configured to search for an image processing apparatus that is able to satisfy the search condition and is installed in an area that a user corresponding to the user information has an entry authority, based on the user information received by the receiving unit and the entry authority information stored in the second storage unit,
wherein the display unit is configured to display information indicating whether each of the image processing apparatuses displayed in the list is installed in an area that the user corresponding to the user information has an entry authority.

2. The image processing system according to claim 1, wherein the information processing apparatus further comprises a determination unit configured to determine whether processing that requires a user entry into an area has been requested by an image processing apparatus,
wherein, if it is determined by the determination unit that the processing that requires a user entry into the area has been requested, the display unit displays information indicating whether each of the image processing apparatuses is installed in an area for which the user corresponding to the user information has an entry authority.

3. The image processing system according to claim 1, wherein the display unit is configured to display, at a same time and in a mutually different form of display, an image processing apparatus present in the area for which the user corresponding to the user information has an entry authority and an image processing apparatus that is installed in an area other than the area for which the user corresponding to the user information has an entry authority.

4. An information processing apparatus configured to communicate with a plurality of image processing apparatuses, each of the image processing apparatuses being installed in any of a plurality of areas, the information processing apparatus comprising:
a first storage unit configured to store information about each of the image processing apparatuses;
a second storage unit configured to store entry authority information about each user, wherein the entry authority information indicates an area for which a user has an entry authority and an area for which the user does not have an entry authority;
a receiving unit configured to receive user information for identifying a user;
a searching unit configured to search for an image processing apparatus that is able to satisfy a received search condition, based on the information stored in the first storage unit; and
an output unit configured to output a result of the search by the searching,
wherein the searching unit is configured to search for an image processing apparatus that is able to satisfy the search condition and is installed in an area that a user corresponding to the user information has an entry authority, based on the user information received by the receiving unit and the entry authority information stored in the second storage unit.

5. The information processing apparatus according to claim 4, wherein the search condition is received from an image processing apparatus among the plurality of image processing apparatuses.

6. The information processing apparatus according to claim 5, wherein the output unit outputs the result of the search to the image processing apparatus to the image processing apparatus that sends the search condition.

7. The information processing apparatus according to claim 6, wherein the image processing apparatus that sends the search condition performs cooperative processing with the image processing apparatus searched by the searching unit.

8. A method for an information processing apparatus configured to communicate with a plurality of image processing apparatuses, each of the image processing apparatuses being installed in any of a plurality of areas, the method comprising:
storing information about each of the image processing apparatuses in a first storage unit;
storing entry authority information about each user in a second storage unit, wherein the entry authority information indicates an area for which a user has an entry authority and an area for which the user does not have an entry authority;
receiving user information for identifying a user;
searching for an image processing apparatus that is able to satisfy a received search condition, based on the information stored in the first storage unit;

and
outputting a result of searching,
wherein searching comprises searching for an image processing apparatus that is able to satisfy the search condition and is installed in an area that a user corresponding to the user information has an entry authority, based on the user information and the entry authority information stored in the second storage unit.

9. A non-transitory computer-readable storage medium having instructions that, when executed by a machine or a processor, cause the machine or the processor to perform operations for an information processing apparatus configured to communicate with a plurality of image processing apparatuses, each of the image processing apparatuses being installed in any of a plurality of areas, the operations comprising:

storing information about each of the image processing apparatuses in a first storage unit;

storing entry authority information about each user in a second storage unit, wherein the entry authority information indicates an area for which a user has an entry authority and an area for which the user does not have an entry authority;

receiving user information for identifying a user;

searching for an image processing apparatus that is able to satisfy a received search condition, based on the information stored in the first storage unit; and outputting a result of searching, wherein searching comprises searching for an image processing apparatus that is able to satisfy the search condition and is installed in an area that a user corresponding to the user information has an entry authority, based on the user information and the entry authority information stored in the second storage unit.

* * * * *